(12) United States Patent
Anderson

(10) Patent No.: US 8,224,500 B2
(45) Date of Patent: *Jul. 17, 2012

(54) DISTRIBUTED KNOWLEDGE BASE PROGRAM FOR VEHICULAR LOCALIZATION AND WORK-SITE MANAGEMENT

(75) Inventor: Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 979 days.

This patent is subject to a terminal disclaimer.

(21) Appl. No.: 12/208,721

(22) Filed: Sep. 11, 2008

(65) Prior Publication Data

US 2010/0063648 A1    Mar. 11, 2010

(51) Int. Cl.
*G06F 7/00*      (2006.01)
(52) U.S. Cl. .......................................................... 701/1
(58) Field of Classification Search .............. 701/23–25, 701/27, 35, 40–41, 59–60, 1; 706/45, 50
See application file for complete search history.

(56) References Cited

U.S. PATENT DOCUMENTS

| | | | |
|---|---|---|---|
| 4,166,349 A | 9/1979 | Coenenberg et al. | |
| 5,334,986 A | 8/1994 | Fernhout | |
| 5,684,476 A | 11/1997 | Anderson | |
| 5,734,932 A | 3/1998 | Washisu | |
| 5,911,669 A | 6/1999 | Stentz et al. | |
| 6,032,097 A | 2/2000 | Iihoshi et al. | |
| 6,038,502 A | 3/2000 | Sudo | |
| 6,101,795 A | 8/2000 | Diekhans | |
| 6,128,559 A | 10/2000 | Saitou et al. | |
| 6,163,277 A | 12/2000 | Gehlot | |
| 6,191,813 B1 | 2/2001 | Fujisaki et al. | |
| 6,246,932 B1 | 6/2001 | Kageyama et al. | |
| 6,313,454 B1 | 11/2001 | Bos et al. | |
| 6,324,586 B1 | 11/2001 | Johnson | |
| 6,356,820 B1 | 3/2002 | Hashimoto et al. | |
| 6,434,622 B1 | 8/2002 | Monteiro et al. | |
| 6,552,661 B1 | 4/2003 | Lastinger et al. | |
| 6,581,571 B2 | 6/2003 | Kubesh et al. | |
| 6,584,390 B2 | 6/2003 | Beck | |
| 6,615,570 B2 | 9/2003 | Beck et al. | |
| 6,650,242 B2 | 11/2003 | Clerk et al. | |
| 6,694,260 B1 | 2/2004 | Rekow | |
| 6,728,608 B2 | 4/2004 | Ollis et al. | |
| 6,732,024 B2 | 5/2004 | Rekow et al. | |
| 6,760,654 B2 | 7/2004 | Beck | |
| 6,839,127 B1 | 1/2005 | Anderson | |
| 6,917,300 B2 | 7/2005 | Allen | |
| 6,943,824 B2 | 9/2005 | Alexia et al. | |
| 7,064,810 B2 | 6/2006 | Anderson et al. | |
| 7,088,252 B2 | 8/2006 | Weekes | |

(Continued)

OTHER PUBLICATIONS

Najjaran, et al., Online Map Building for Terrain Scanning Robots using a Hybrid Neurofuzzy Kalman Filter, IEEE, 2004, pp. 814-819.*

(Continued)

*Primary Examiner* — Kim T Nguyen
(74) *Attorney, Agent, or Firm* — Yee & Associates, P.C.; Jeremy J. Westlake

(57) ABSTRACT

The illustrative embodiments provide a computer program product for controlling a vehicle. In an illustrative embodiment, a computer program product is comprised of a computer recordable media having computer usable program code for identifying a dynamic condition. When the dynamic condition is identified, computer usable program code using a knowledge base controls the vehicle.

3 Claims, 12 Drawing Sheets

U.S. PATENT DOCUMENTS

| | | |
|---|---|---|
| 7,164,118 B2 | 1/2007 | Anderson et al. |
| 7,167,797 B2 | 1/2007 | Faivre et al. |
| 7,222,004 B2 | 5/2007 | Anderson |
| 7,266,477 B2 | 9/2007 | Foessel |
| 7,286,934 B2 | 10/2007 | Gaegauf et al. |
| 7,299,056 B2 | 11/2007 | Anderson |
| 7,299,057 B2 | 11/2007 | Anderson |
| 7,313,404 B2 | 12/2007 | Anderson |
| 7,317,977 B2 | 1/2008 | Matrosov |
| 7,330,117 B2 | 2/2008 | Ferguson et al. |
| 7,375,627 B2 | 5/2008 | Johnson et al. |
| 7,382,274 B1 | 6/2008 | Kermani et al. |
| 7,499,776 B2 | 3/2009 | Allard et al. |
| 7,545,286 B2 | 6/2009 | Yanase |
| 7,561,948 B2 | 7/2009 | Gaegauf et al. |
| 7,579,939 B2 | 8/2009 | Schofield et al. |
| 7,668,621 B2 | 2/2010 | Bruemmer |
| 7,693,624 B2 | 4/2010 | Duggan et al. |
| 7,719,410 B2 | 5/2010 | Labuhn et al. |
| 7,725,261 B2 | 5/2010 | Sekiguchi |
| 7,734,419 B2 | 6/2010 | Kondoh |
| 7,742,864 B2 | 6/2010 | Sekiguchi |
| 7,852,233 B2 | 12/2010 | Cemper |
| 7,894,982 B2 | 2/2011 | Reeser et al. |
| 7,916,898 B2 | 3/2011 | Anderson |
| 8,020,657 B2 | 9/2011 | Allard et al. |
| 8,031,085 B1 | 10/2011 | Anderson |
| 2005/0088643 A1 | 4/2005 | Anderson |
| 2005/0275542 A1 | 12/2005 | Weekes |
| 2006/0173593 A1 | 8/2006 | Anderson |
| 2006/0180647 A1 | 8/2006 | Hansen |
| 2006/0189324 A1 | 8/2006 | Anderson |
| 2006/0221328 A1 | 10/2006 | Rouly |
| 2007/0171037 A1 | 7/2007 | Schofield et al. |
| 2007/0193798 A1 | 8/2007 | Allard et al. |
| 2007/0198144 A1 | 8/2007 | Norris et al. |
| 2008/0009970 A1 | 1/2008 | Bruemmer |
| 2008/0167781 A1 | 7/2008 | Labuhn et al. |
| 2009/0018712 A1 | 1/2009 | Duncan et al. |
| 2009/0216406 A1 | 8/2009 | Senneff et al. |
| 2009/0221328 A1 | 9/2009 | Schumacher et al. |
| 2009/0259399 A1 | 10/2009 | Kotejoshyer et al. |
| 2009/0266946 A1 | 10/2009 | Shimizu |
| 2009/0268946 A1 | 10/2009 | Zhang et al. |
| 2009/0299581 A1 | 12/2009 | Price |
| 2010/0036546 A1 | 2/2010 | Gomes et al. |
| 2010/0063626 A1 | 3/2010 | Anderson |
| 2010/0063651 A1 | 3/2010 | Anderson |
| 2010/0063652 A1 | 3/2010 | Anderson |
| 2010/0063663 A1 | 3/2010 | Tolstedt et al. |
| 2010/0063664 A1 | 3/2010 | Anderson |
| 2010/0063672 A1 | 3/2010 | Anderson |
| 2010/0063673 A1 | 3/2010 | Anderson |
| 2010/0063680 A1 | 3/2010 | Tolstedt et al. |
| 2010/0063954 A1 | 3/2010 | Anderson |
| 2010/0081411 A1 | 4/2010 | Montenero |
| 2010/0131122 A1 | 5/2010 | Dersj et al. |
| 2010/0289662 A1 | 11/2010 | Dasilva et al. |
| 2010/0332061 A1 | 12/2010 | Forslow et al. |

OTHER PUBLICATIONS

Borenstein et al., "Where am I?"—Systems and Methods for Mobile Robot Positioning, Mar. 1996, pp. 1-281 http://www-personal.umich.edu/~johannb/shared/pos96rep.pdf.

Qishi Wu, "On Optimal Deployment of Probabilistic Detectors in the Plane", abstract—1 page, retrieved Oct. 13, 2009 http://bit.csc.lsu.edu/news/news200204102.html.

Deans et al., "Localization and Mapping using Bearings Only Sensors", retrieved Oct. 13, 2009 pp. 1-3 http://www.cs.cmu.edu/~rll/guide2001/deans/html/deans.html.

"Computers and Software", Capitalist Lion, pp. 1-7, retrieved Oct. 13, 2009, http://capitalistlion.com/essays/vid-platforms.html.

Yao, "Video Stabilization", retrieved Oct. 13, 2009, pp. 1-2 http://www.cfarumd.edu/~yao/video_stabilization.html.

Kelly, "Precision Dilution in Triangulation Based Mobile Robot Position Estimation", pp. 1-8, retrieved Oct. 13, 2009 http://www.frc.ri.cmu.edu/~alonzo/pubs/papers/ias8.pdf.

Willemsen, "Marine Navigation Courses: Lines of Position, Position Fixes: 4 Plotting and Piloting", pp. 1-12, retrieved Oct. 13, 2009 http://www.sailingissues.com/navcourse4.html.

"FleetSubmarine.com", retrieved Oct. 13, 2009 pp. 1-14 http://fleetsubmarine.com/periscope.html.

Kiriy, "A Localization System for Autonomous Golf Course Mowers," Masters Thesis, McGill University, Montreal, Canada, Nov. 2002, 122 pages.

U.S. Appl. No. 12/903,883, dated Oct. 13, 2010, 67 pages.

U.S. Appl. No. 13/268,288, dated Oct. 7, 2011, 61 pages.

USPTO Office Action regarding U.S. Appl. No. 12/208,710, dated Jul. 20, 2011, 18 pages.

* cited by examiner

FIG. 11

SENSOR TABLE 1100

| | NORMAL OPERATING CONDITIONS 1104 | EARLY FALL 1108 | WINTER 1112 | NOTES |
|---|---|---|---|---|
| GPS 1102 | GOOD TO POOR QUALITY SIGNAL RECEPTION 1106 | GOOD TO POOR QUALITY SIGNAL RECEPTION 1110 | GOOD TO VERY GOOD SIGNAL RECEPTION 1114 | USE AS SEED FOR MAP MATCHING |
| VISIBLE CAMERA IMAGES OF A CURB OR STREET EDGE 1116 | EXCELLENT QUALITY IMAGES 1118 | UNUSABLE QUALITY IMAGES 1120 | UNUSABLE QUALITY IMAGES 1122 | |
| VISIBLE CAMERA IMAGES (8 FT. UP) 1124 | EXCELLENT QUALITY IMAGES 1126 | EXCELLENT QUALITY IMAGES 1128 | GOOD TO EXCELLENT QUALITY IMAGES 1130 | |
| VISIBLE CAMERA IMAGES OF THE STREET CROWN 1132 | GOOD QUALITY IMAGES 1134 | GOOD TO POOR QUALITY IMAGES 1136 | UNUSABLE QUALITY IMAGES 1138 | |
| LIDAR IMAGES OF A CURB 1140 | EXCELLENT 1142 | UNUSABLE 1144 | UNUSABLE 1144 | |
| LIDAR (8 FT. UP) 1146 | EXCELLENT 1148 | EXCELLENT 1148 | EXCELLENT 1148 | |
| LIDAR (SKY) 1150 | UNUSABLE DUE TO CANOPY 1152 | UNUSABLE TO POOR 1154 | EXCELLENT 1156 | |

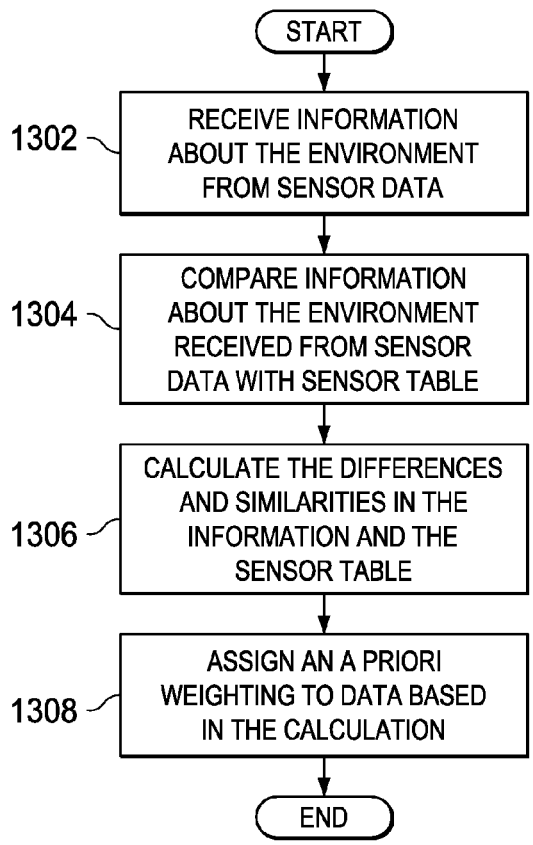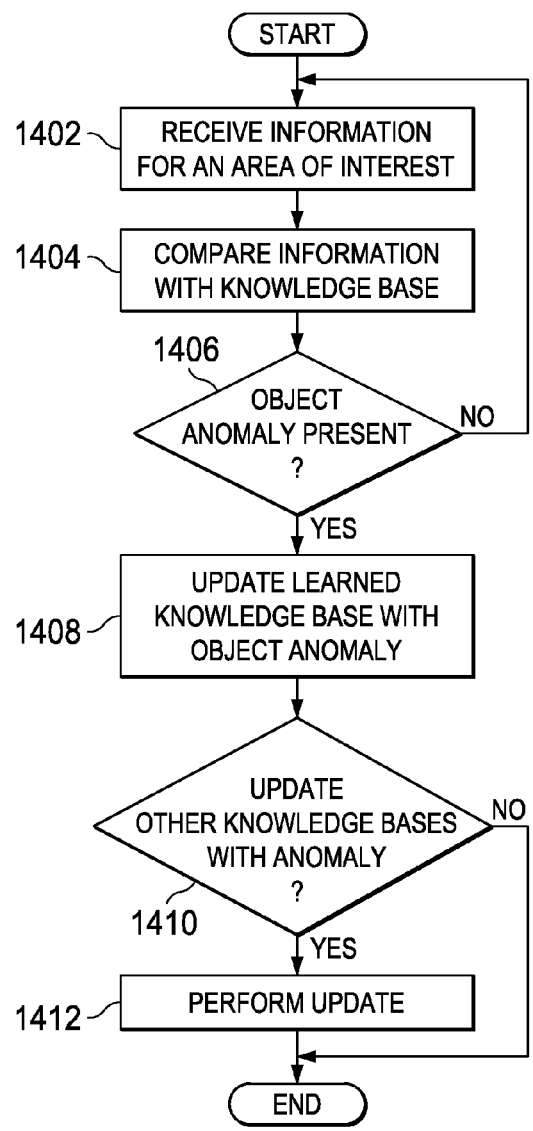

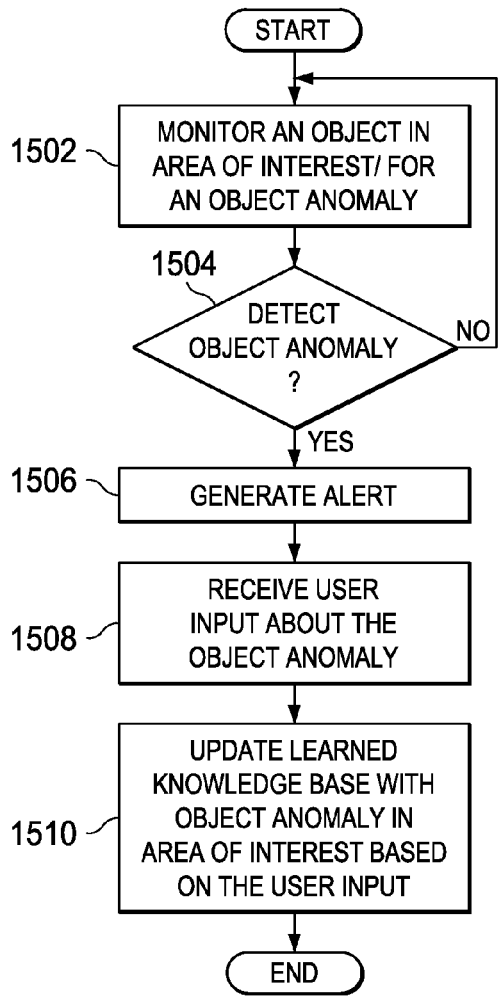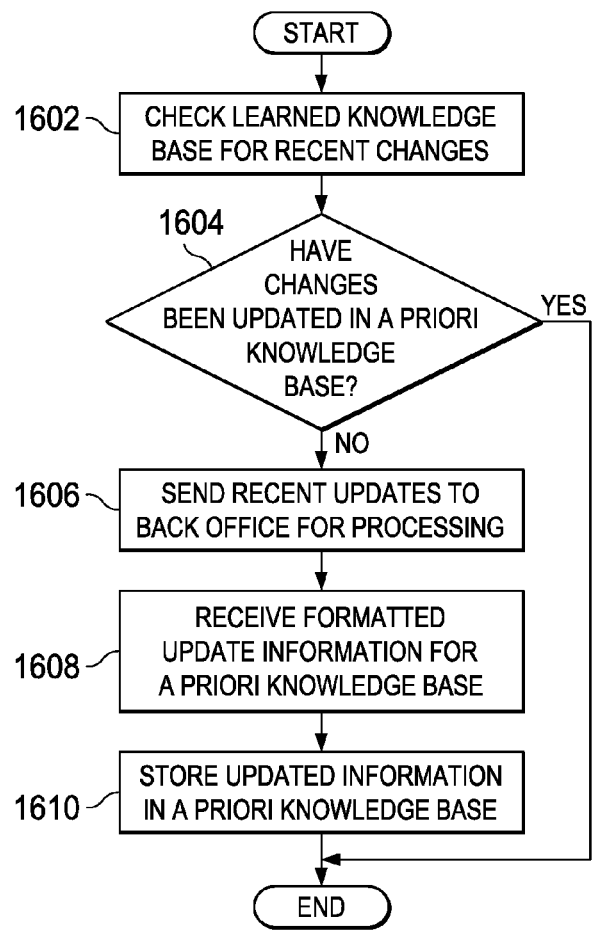

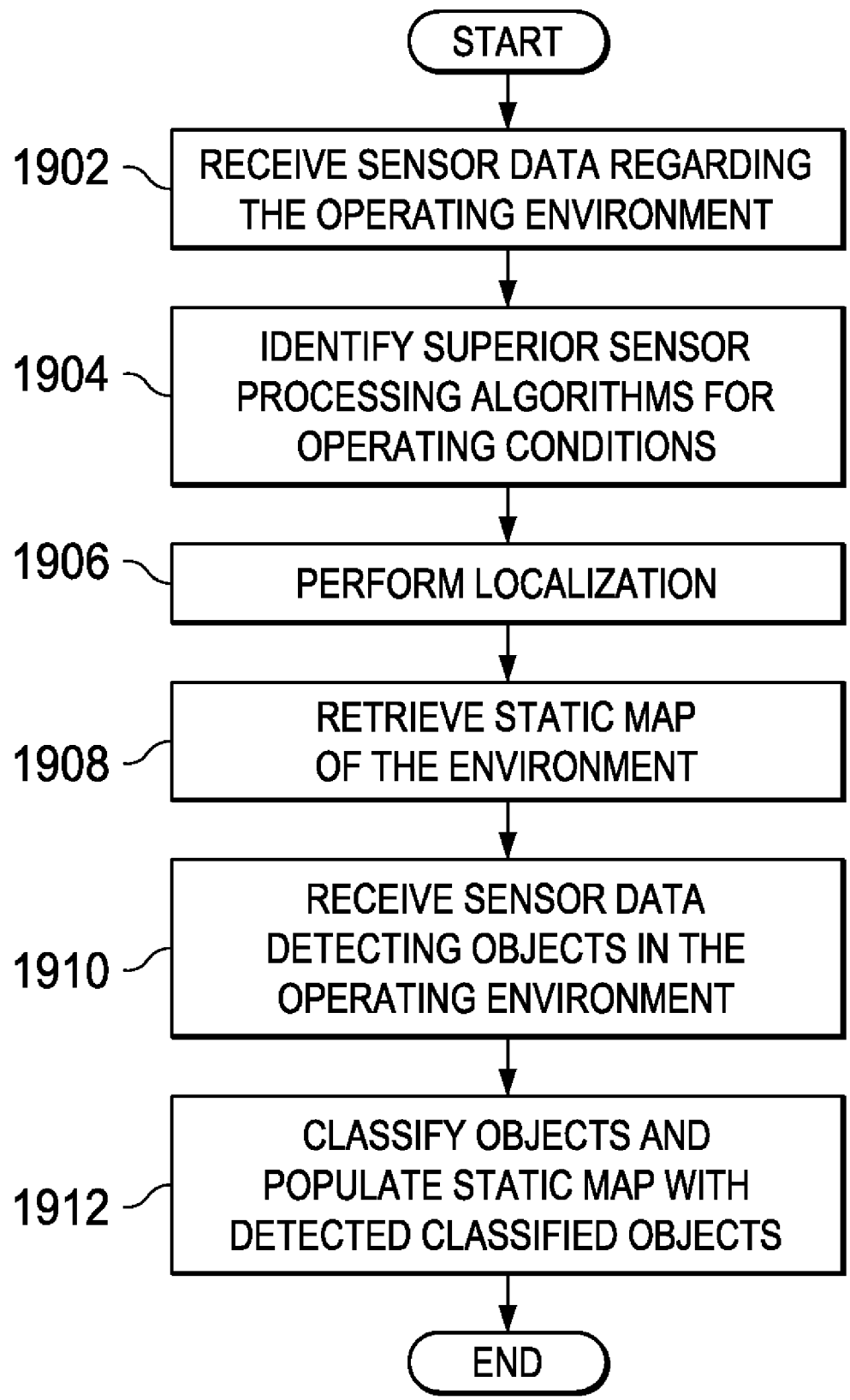

DISTRIBUTED KNOWLEDGE BASE PROGRAM FOR VEHICULAR LOCALIZATION AND WORK-SITE MANAGEMENT

CROSS REFERENCE TO RELATED APPLICATIONS

This application is related to commonly assigned and co-pending U.S. patent application Ser. No. 12/208,752 entitled "Leader-Follower Semi-Autonomous Vehicle with Operator on Side"; U.S. patent application Ser. No. 12/208,659 entitled "Leader-Follower Fully-Autonomous Vehicle with Operator on Side"; U.S. patent application Ser. No. 12/208,691 entitled "High Integrity Perception for Machine Localization and Safeguarding"; U.S. patent application Ser. No. 12/208,666 entitled "Distributed Knowledge Base For Vehicular Localization And Work-Site Management"; U.S. patent application Ser. No. 12/208,782 entitled "Distributed Knowledge Base Method For Vehicular Localization And Work-Site Management"; U.S. patent application Ser. No. 12/208,851 entitled "Vehicle With High Integrity Perception System"; U.S. patent application Ser. No. 12/208,885 entitled "Multi-Vehicle High Integrity Perception"; and U.S. patent application Ser. No. 12/208,710 entitled "High Integrity Perception Program" all of which are hereby incorporated by reference.

FIELD OF THE INVENTION

The present disclosure relates generally to systems and methods for vehicle navigation and more particularly systems and methods for a distributed knowledge base within a vehicle for controlling operation of a vehicle. As an example, embodiments of this invention provide a method and system utilizing a versatile robotic control module for localization and navigation of a vehicle.

BACKGROUND OF THE INVENTION

An increasing trend towards developing automated or semi-automated equipment is present in today's work environment. In some situations with the trend, this equipment is completely different from the operator-controlled equipment that is being replaced, and does not allow for any situations in which an operator can be present or take over operation of the vehicle. Such unmanned equipment can be unreliable due to the complexity of systems involved, the current status of computerized control, and uncertainty in various operating environments. As a result, semi-automated equipment is more commonly used. This type of equipment is similar to previous operator-controlled equipment, but incorporates one or more operations that are automated rather than operator-controlled. This semi-automated equipment allows for human supervision and allows the operator to take control when necessary.

SUMMARY

The illustrative embodiments provide a computer program product for controlling a vehicle. In an illustrative embodiment, a computer program product is comprised of a computer recordable media having computer usable program code for identifying a dynamic condition. When the dynamic condition is identified, computer usable program code using a knowledge base controls the vehicle.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

FIG. 11 is a block diagram of a sensor selection table in a knowledge base used to weigh and select sensors for use in planning paths and obstacle avoidance in accordance with an illustrative embodiment;

FIG. 13 is a flowchart illustrating a process for prioritizing sensor data in accordance with an illustrative embodiment;

FIG. 14 is a flowchart illustrating a process for unsupervised learning by a knowledge base in accordance with an illustrative embodiment;

FIG. 15 is a flowchart illustrating a process for supervised learning by a knowledge base in accordance with an illustrative embodiment;

FIG. 16 is a flowchart illustrating a process for updating an a priori knowledge base in conjunction with supervised learning in accordance with an illustrative embodiment;

FIG. 19 is a flowchart illustrating a process for generating a thematic map in accordance with an illustrative embodiment.

DESCRIPTION OF THE PREFERRED EMBODIMENT

Figure 1:
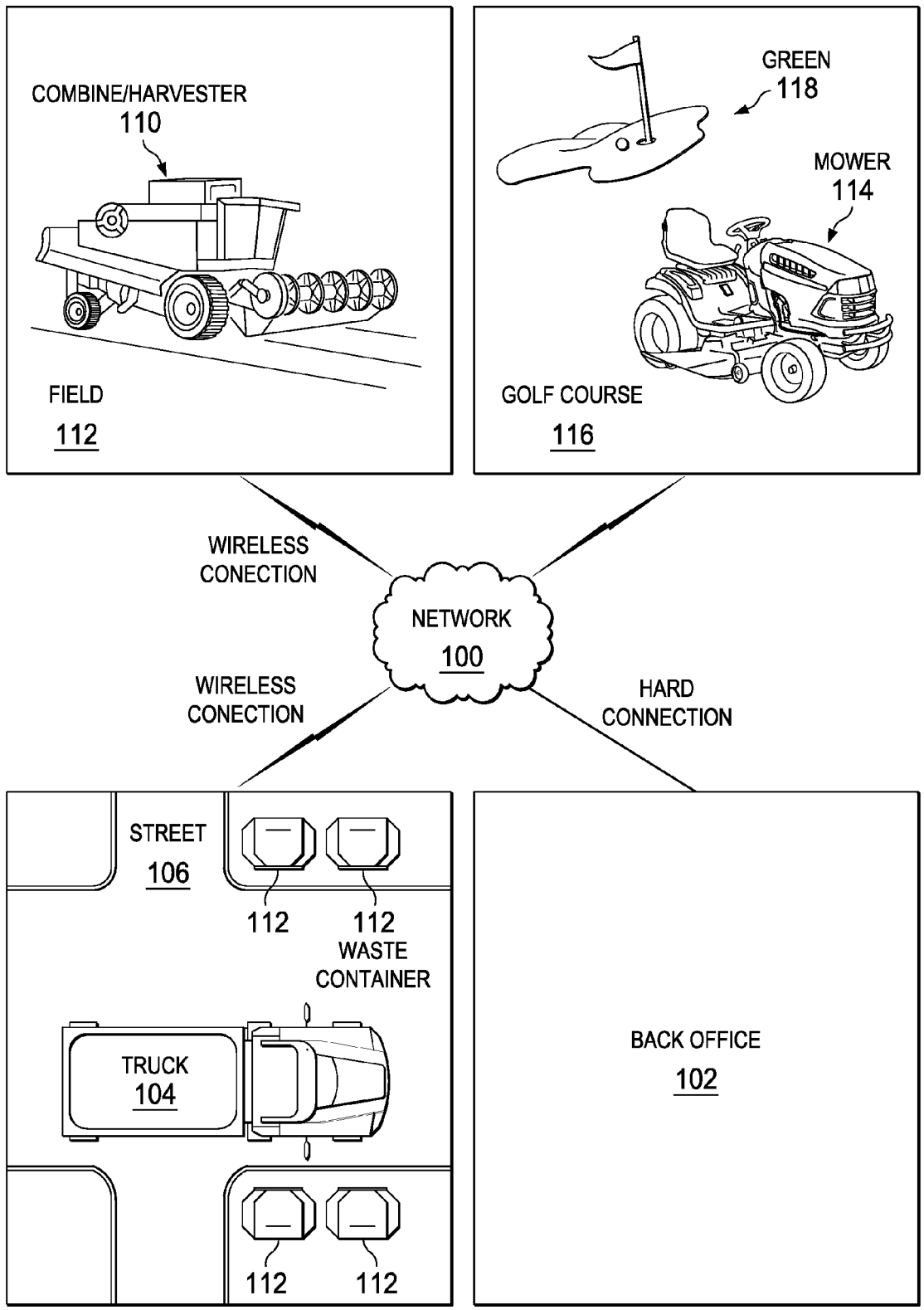
FIG. 1 is a block diagram of different vehicles operating in a network environment in accordance with an illustrative embodiment.

Embodiments of this invention provide systems and methods for vehicle navigation and more particularly systems and methods for a distributed knowledge base within a vehicle for controlling operation of a vehicle. As an example, embodiments of this invention provide a method and system for utilizing a versatile robotic control module for localization and navigation of a vehicle.

Robotic or autonomous vehicles, sometimes referred to as mobile robotic platforms, generally have a robotic control system that controls the operational systems of the vehicle. In a vehicle that is limited to a transportation function, the operational systems may include steering, braking, transmission, and throttle systems. Such autonomous vehicles generally have a centralized robotic control system for control of the operational systems of the vehicle. Some military vehicles have been adapted for autonomous operation. In the United States, some tanks, personnel carriers, Stryker vehicles, and other vehicles have been adapted for autonomous capability. Generally, these are to be used in a manned mode as well.

Robotic control system sensor inputs may include data associated with the vehicle's destination, preprogrammed path information, and detected obstacle information. Based on such data associated with the information above, the vehicle's movements are controlled. Obstacle detection systems within a vehicle commonly use scanning lasers to scan a beam over a field of view, or cameras to capture images over a field of view. The scanning laser may cycle through an entire range of beam orientations, or provide random access to any particular orientation of the scanning beam. The camera or cameras may capture images over the broad field of view, or of a particular spectrum within the field of view. For obstacle detection applications of a vehicle, the response time for collecting image data should be rapid over a wide field of view to facilitate early recognition and avoidance of obstacles.

Location sensing devices include odometers, global positioning systems, and vision-based triangulation systems. Many location sensing devices are subject to errors in providing an accurate location estimate over time and in different geographic positions. Odometers are subject to material errors due to surface terrain. Satellite-based guidance systems, such as global positioning system-based guidance systems, which are commonly used today as a navigation aid in cars, airplanes, ships, computer-controlled harvesters, mine trucks, and other vehicles, may experience difficulty guiding when heavy foliage or other permanent obstructions, such as mountains, buildings, trees, and terrain, prevent or inhibit global positioning system signals from being accurately received by the system. Vision-based triangulation systems may experience error over certain angular ranges and distance ranges because of the relative position of cameras and landmarks.

In order to provide a system and method where a combination manned/autonomous vehicle accurately navigates and manages a work-site, specific mechanical accommodations for processing means and location sensing devices are required. Therefore, it would be advantageous to have a method and apparatus to provide additional features for navigation of vehicles.

With reference to the figures and in particular with reference to FIG. 1, embodiments of the present invention may be used in a variety of vehicles, such as automobiles, trucks, harvesters, combines, agricultural equipment, tractors, mowers, armored vehicles, and utility vehicles. Embodiments of the present invention may also be used in a single computing system or a distributed computing system.

FIG. 1 depicts a block diagram of different vehicles operating in a network environment in accordance with an illustrative embodiment. FIG. 1 depicts an illustrative environment including network 100 in one embodiment of the present invention. In this example, back office 102 may be a single computer or a distributed computing cloud. Back office 102 supports the physical databases and/or connections to external databases which underlie the knowledge bases used in the different illustrative embodiments. Back office 102 may supply knowledge bases to different vehicles, as well as provide online access to information from knowledge bases.

In this example, truck 104 is a six-wheeled, diesel powered utility vehicle, such as a waste collection vehicle, which may navigate along street 106 in a leader/follower mode. In this example, truck 104 may be used to collect waste from waste containers 112. In this example, combine/harvester 110 may be any type of harvesting, threshing, crop cleaning, or other agricultural vehicle. Combine/harvester 110 operates on field 112, which may be any type of land used to cultivate crops for agricultural purposes. In this example, mower 114 may be any type of machine for cutting crops or plants that grow on the ground. Mower 114 operates on golf course 116 and may be used on any portion of golf course 116, such as, without limitation, the fairway, rough, or green 118.

In an illustrative example, truck 104 may move along street 106 following a leader using a number of different modes of operation to aid an operator in collecting waste from waste containers 112. The modes include, for example, a side following mode, a teach and playback mode, a teleoperation mode, a path mapping mode, a straight mode, and other suitable modes of operation. An operator may be a person being followed as the leader when the vehicle is operating in a side-following mode, a person driving the vehicle, or a person controlling the vehicle movements in teleoperation mode.

In one example, in the side following mode, an operator is the leader and truck 104 is the follower. In another example, in the side following mode another vehicle may be the leader and truck 104 is the follower. In yet another example, truck 104 may be the leader with another vehicle following truck 104.

The side following mode may include preprogrammed maneuvers in which an operator may change the movement of truck 104 from an otherwise straight travel path for truck 104. For example, if an obstacle is detected on street 106, the operator may initiate a go around obstacle maneuver that causes truck 104 to steer out and around an obstacle in a preset path. With this mode, automatic obstacle identification and avoidance features may still be used. The different actions taken by truck 104 may occur with the aid of a knowledge base in accordance with an illustrative embodiment. The knowledge base used by truck 104 may be stored within truck 104 and/or accessed remotely from a location, such as back office 102.

In another example, an operator may drive combine/harvester 110 along a path on field 112 without stops, generating a mapped path. After driving the path, the operator may move combine/harvester 110 back to the beginning of the mapped path. In the second pass on field 112, the operator may cause combine/harvester 110 to drive the mapped path from start point to end point without stopping, or may cause combine/harvester 110 to drive the mapped path with stops along the mapped path. In this manner, combine/harvester 110 drives from start to finish along the mapped path. Combine/harvester 110 still may include some level of obstacle detection to combine/harvester 110 from running over or hitting an obstacle, such as a field worker or another agricultural vehicle. These actions also may occur with the aid of a knowledge base in accordance with an illustrative embodiment.

In a teleoperation mode, for example, an operator may operate or wirelessly drive mower 114 across golf course 116 in a fashion similar to other remote controlled vehicles. With this type of mode of operation, the operator may control mower 114 through a wireless controller.

In a path mapping mode, the different paths may be mapped by an operator prior to reaching street 106, field 112, or golf course 116. With the waste collection example, routes may be identical for each trip and the operator may rely on the fact that truck 104 will move along the same path each time. Intervention or deviation from the mapped path may occur only when an obstacle is present. Again, with the path mapping mode, way points may be set to allow truck 104 to stop at waste collection points.

In a straight mode, truck 104 may be placed in the middle or offset from some distance from a curb on street 106. Truck 104 may move down the street along a straight line allowing one or more operators to walk on either side of truck 104 to collect waste. In this type of mode of operation, the path of truck 104 is always straight unless an obstacle is encountered. In this type of mode of operation, the operator may start and stop truck 104 as needed. This type of mode may minimize the intervention needed by a driver. Some or all of the different operations in these examples may be performed with the aid of a knowledge base in accordance with an illustrative embodiment.

In different illustrative embodiments, the different types of mode of operation may be used in combination to achieve the desired goals. In these examples, at least one of these modes of operation may be used to minimize driving while maximizing safety and efficiency in a waste collection process. In these examples, each of the different types of vehicles depicted may utilize each of the different types of mode of operation to achieve desired goals. As used herein the phrase "at least one of" when used with a list of items means that different combinations of one or more of the items may be used and only one of each item in the list may be needed. For example, "at least one of item A, item B, and item C" may include, for example, without limitation, item A or item A and item B. This example also may include item A, item B, and item C or item B and item C. As another example, at least one of item A, item B, and item C may include item A, two of item B, and 4 of item C.

In different illustrative embodiments, dynamic conditions impact the movement of a vehicle. A dynamic condition is a change in the environment around a vehicle. For example, a dynamic condition may include, without limitation movement of another vehicle in the environment to a new location, detection of an obstacle, detection of a new object or objects in the environment, receiving user input to change the movement of the vehicle, receiving instructions from a back office, such as back office 102, and the like. In response to a dynamic condition, the movement of a vehicle may be altered in various ways, including, without limitation stopping the vehicle, accelerating propulsion of the vehicle, decelerating propulsion of the vehicle, and altering the direction of the vehicle, for example.

Further, autonomous routes may include several straight blocks. In other examples, a path may go around blocks in a square or rectangular pattern. Of course, other types of patterns also may be used depending upon the particular implementation. Routes and patterns may be performed with the aid of a knowledge base in accordance with an illustrative embodiment. In these examples, an operator may drive truck 104 onto a block or to a beginning position of a path. The operator also may monitor truck 104 for safe operation and ultimately provide overriding control for the behavior of truck 104.

In these examples, a path may be a preset path, a path that is continuously planned with changes made by truck 104 to follow an operator in a side following mode, a path that is directed by the operator using a remote control in a teleoperation mode, or some other path. The path may be any length depending on the implementation. Paths may be stored and accessed with the aid of a knowledge base in accordance with an illustrative embodiment.

Thus, the different illustrative embodiments provide a number of different modes to operate a number of different vehicles, such as truck 104, combine/harvester 110, and mower 114. Although FIG. 1 illustrates a vehicle for waste collection, a vehicle for harvesting or threshing agricultural crops, and a vehicle for cutting crops or plants that grow on the ground, this illustration is not meant to limit the manner in which different modes may be applied. For example, the different illustrative embodiments may be applied to other types of vehicles and other types of uses. As a specific example, the different illustrative embodiments may be applied to a military vehicle in which a soldier uses a side following mode to provide a shield across a clearing. In other embodiments, the vehicle may have a chemical sprayer mounted and follow an operator as the operator applies chemicals to crops or other foliage. These types of modes also may provide obstacle avoidance and remote control capabilities. As yet another example, the different illustrative embodiments may be applied to delivery vehicles, such as those for the post office or other commercial delivery vehicles.

The illustrative embodiments recognize a need for a system and method where a combination manned/autonomous vehicle can accurately navigate and manage a work-site. Therefore, the illustrative embodiments provide a computer implemented method, apparatus, and computer program product for controlling a vehicle. A dynamic condition is identified and the vehicle is controlled using a knowledge base comprising a fixed knowledge base and a learned knowledge base.

Figure 2:
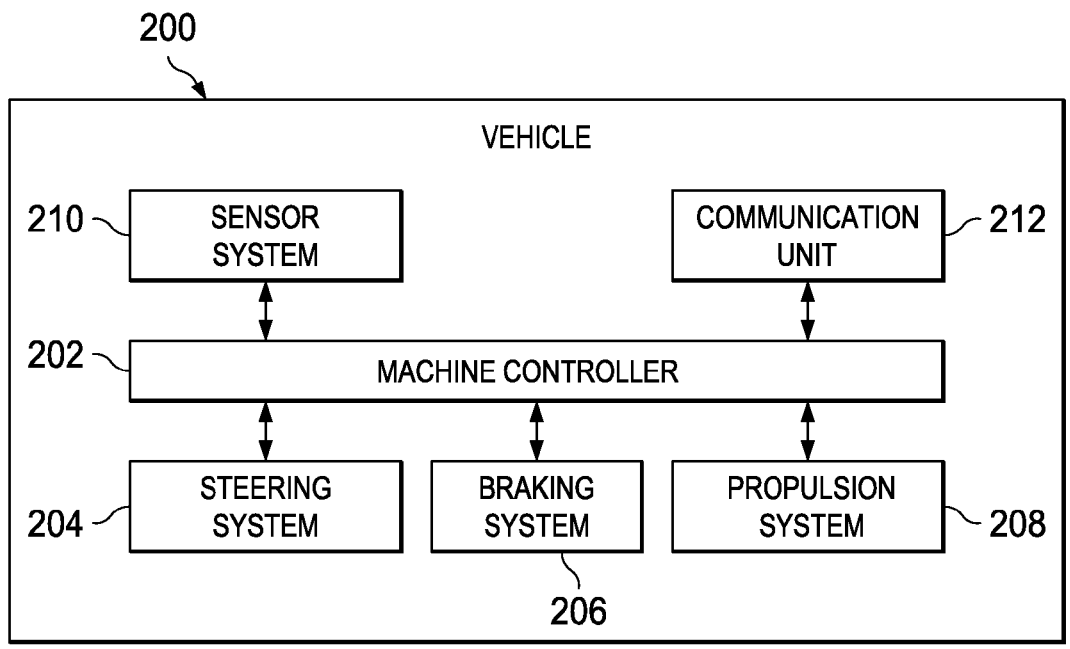
FIG. 2 is a block diagram of components used to control a vehicle in accordance with an illustrative embodiment.

With reference now to FIG. 2, a block diagram of components used to control a vehicle is depicted in accordance with an illustrative embodiment. In this example, vehicle 200 is an example of a vehicle, such as truck 104, combine/harvester 112, and mower 114 in FIG. 1. In this example, vehicle 200 includes machine controller 202, steering system 204, braking system 206, propulsion system 208, sensor system 210, and communication unit 212.

Machine controller 202 may be, for example, a data processing system or some other device that may execute processes to control movement of a vehicle. Machine controller 202 may be, for example, a computer, an application integrated specific circuit, or some other suitable device. Machine controller 202 may execute processes to control steering system 204, breaking system 206, and propulsion system 208 to control movement of the vehicle. Machine controller 202 may send various commands to these components to operate the vehicle in different modes of operation. These commands may take various forms depending on the implementation. For example, the commands may be analog electrical signals in which a voltage and/or current change is used to control these systems. In other implementations, the commands may take the form of data sent to the systems to initiate the desired actions.

Steering system 204 may control the direction or steering of the vehicle in response to commands received from machine controller 202. Steering system 204 may be, for example, an electrically controlled hydraulic steering system, an electrically driven rack and pinion steering system, an Ackerman steering system, a skid-steer steering system, a differential steering, or some other suitable steering system.

Braking system 206 may slow down and/or stop the vehicle in response to commands from machine controller 202. Braking system 206 may be an electrically controlled steering system. This steering system may be, for example, a hydraulic braking system, a friction braking system, or some other suitable braking system that may be electrically controlled.

In these examples, propulsion system 208 may propel or move the vehicle in response to commands from machine controller 202. Propulsion system 208 may maintain or increase the speed at which a vehicle moves in response to instructions received from machine controller 202. Propulsion system 208 may be an electrically controlled propulsion system. Propulsion system 208 may be, for example, an internal combustion engine, an internal combustion engine/electric hybrid system, an electric engine, or some other suitable propulsion system.

Sensor system 210 may be a set of sensors used to collect information about the environment around a vehicle. In these examples, the information is sent to machine controller 202 to provide data in identifying how the vehicle should move in different modes of operation. In these examples, a set refers to one or more items. A set of sensors is one or more sensors in these examples.

Communication unit 212 may provide communications links to machine controller 202 to receive information. This information includes, for example, data, commands, and/or instructions. Communication unit 212 may take various forms. For example, communication unit 212 may include a wireless communications system, such as a cellular phone system, a Wi-Fi wireless system, a Bluetooth wireless system, or some other suitable wireless communications system. Further, communication unit 212 also may include a communications port, such as, for example, a universal serial bus port, a serial interface, a parallel port interface, a network interface, or some other suitable port to provide a physical communications link. Communication unit 212 may be used to communicate with a remote location or an operator.

Figure 3:
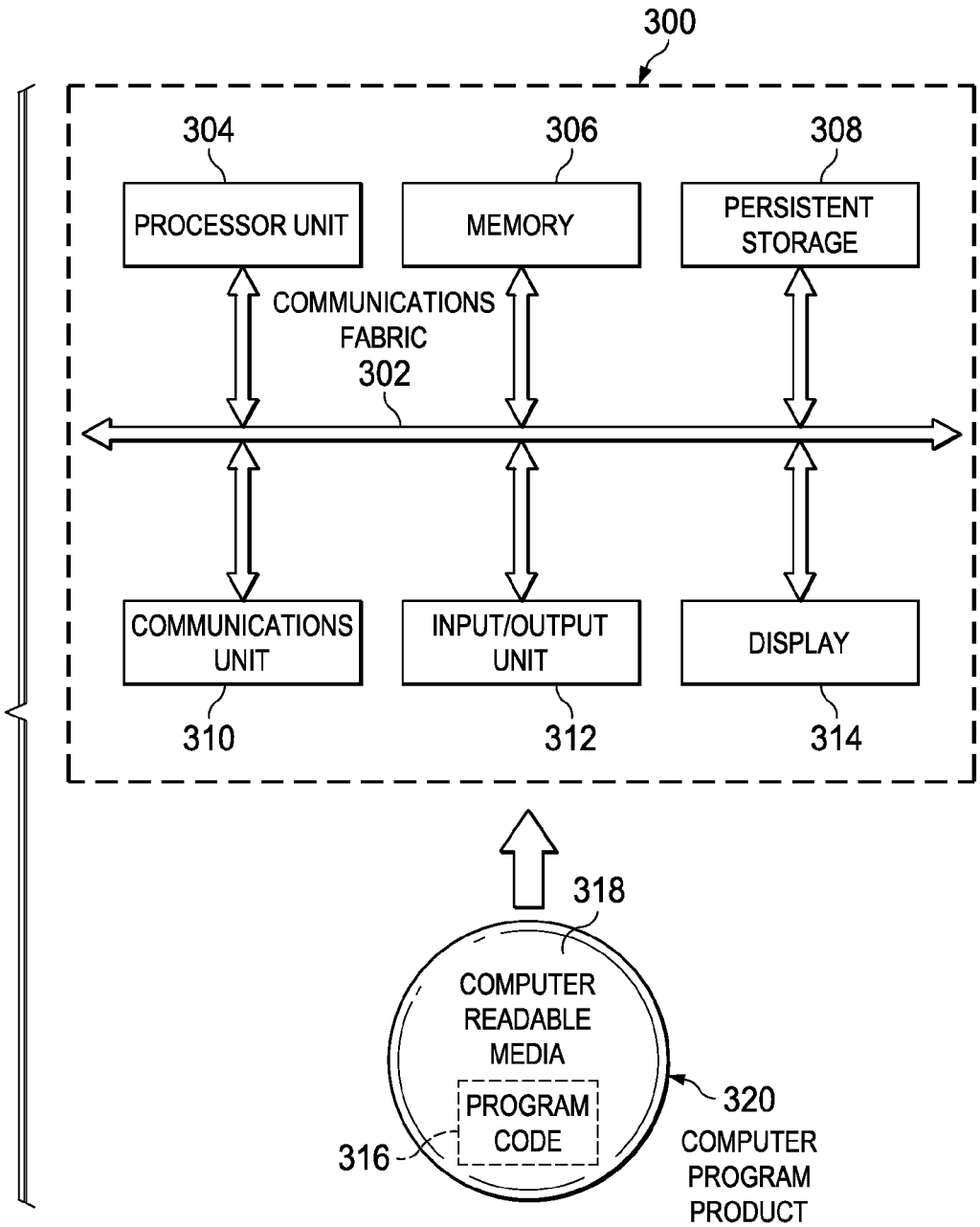
FIG. 3 is a block diagram of a data processing system in accordance with an illustrative embodiment.

With reference now to FIG. 3, a block diagram of a data processing system is depicted in accordance with an illustrative embodiment. Data processing system 300 is an example of one manner in which machine controller 202 in FIG. 2 may be implemented. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multiprocessor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, a random access memory or any other suitable volatile or non-volatile storage device. Persistent storage 308 may take various forms depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308, and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache, such as found in an interface and memory controller hub that may be present in communications fabric 302.

Figure 4:
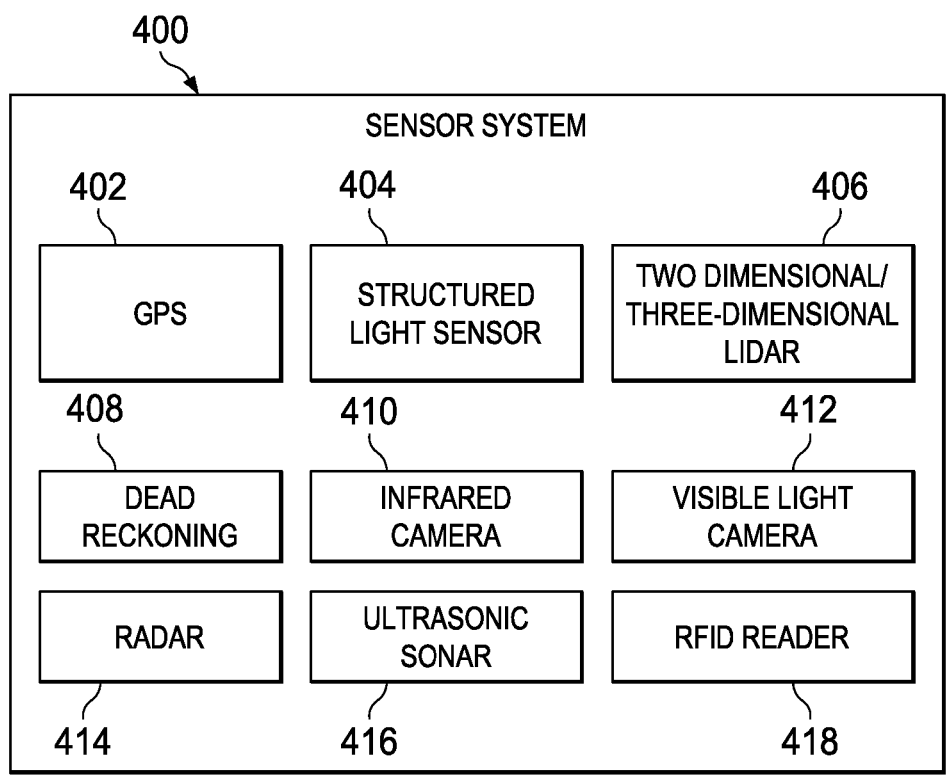
FIG. 4 is a block diagram of a sensor system in accordance with an illustrative embodiment.

With reference now to FIG. 4, a block diagram of a sensor system is depicted in accordance with an illustrative embodiment. Sensor system 400 is an example of one implementation of sensor system 210 in FIG. 2. As illustrated, sensor system 400 includes, for example, global positioning system 402, structured light sensor 404, two dimensional/three dimensional lidar 406, dead reckoning 408, infrared camera 410, visible light camera 412, radar 414, ultrasonic sonar 416, and radio frequency identification reader 418. These different sensors may be used to identify the environment around a vehicle. The sensors in sensor system 400 may be selected such that one of the sensors is always capable of sensing information needed to operate the vehicle in different operating environments.

Global positioning system 402 may identify the location of the vehicle with respect to other objects in the environment. Global positioning system 402 may be any type of radio frequency triangulation scheme based on signal strength and/or time of flight. Examples include, without limitation, the Global Positioning System, Glonass, Galileo, and cell phone tower relative signal strength. Position is typically reported as latitude and longitude with an error that depends on factors, such as ionispheric conditions, satellite constellation, and signal attenuation from vegetation.

Structured light sensor 404 emits light in a pattern, such as one or more lines, reads back the reflections of light through a camera, and interprets the reflections to detect and measure objects in the environment. Two dimensional/three dimensional lidar 406 is an optical remote sensing technology that measures properties of scattered light to find range and/or other information of a distant target. Two dimensional/three dimensional lidar 406 emits laser pulses as a beam, than scans the beam to generate two dimensional or three dimensional range matrices. The range matrices are used to determine distance to an object or surface by measuring the time delay between transmission of a pulse and detection of the reflected signal.

Dead reckoning 408 begins with a known position, which is then advanced, mathematically or directly, based upon known speed, elapsed time, and course. The advancement based upon speed may use the vehicle odometer, or ground speed radar, to determine distance traveled from the known position. Infrared camera 410 detects heat indicative of a living thing versus an inanimate object. An infrared camera may also form an image using infrared radiation. Visible light camera 412 may be a standard still-image camera, which may be used alone for color information or with a second camera to generate stereoscopic, or three-dimensional, images. When visible light camera 412 is used along with a second camera to generate stereoscopic images, the two or more cameras may be set with different exposure settings to provide improved performance over a range of lighting conditions. Visible light camera 412 may also be a video camera that captures and records moving images.

Radar 414 uses electromagnetic waves to identify the range, altitude, direction, or speed of both moving and fixed objects. Radar 414 is well known in the art, and may be used in a time of flight mode to calculate distance to an object, as well as Doppler mode to calculate the speed of an object. Ultrasonic sonar 416 uses sound propagation on an ultrasonic frequency to measure the distance to an object by measuring the time from transmission of a pulse to reception and converting the measurement into a range using the known speed of sound. Ultrasonic sonar 416 is well known in the art and can also be used in a time of flight mode or Doppler mode, similar to radar 414. Radio frequency identification reader 418 relies on stored data and remotely retrieves the data using devices called radio frequency identification (RFID) tags or transponders.

Sensor system 400 may retrieve environmental data from one or more of the sensors to obtain different perspectives of the environment. For example, sensor system 400 may obtain visual data from visible light camera 412, data about the distance of the vehicle in relation to objects in the environment from two dimensional/three dimensional lidar 406, and location data of the vehicle in relation to a map from global positioning system 402.

Sensor system 400 is capable of detecting objects even in different operating environments. For example, global positioning system 402 may be used to identify a position of the vehicle. If the street has trees with thick canopies during the spring, global positioning system 402 may be unable to provide accurate location information. In some cases, conditions may cause the location information provided by global positioning system 402 to be less accurate than desired. For example, in a condition with a heavy canopy, the signal from a satellite to a global positioning system receiver is attenuated and more prone to multipath. Multipath results when a signal between a GPS satellite and a receiver follows multiple paths, typically caused by reflection from objects in the environment. These multiple signals can interfere with one another and the result may be phase shifting or destructive interference of the combined received signal. The signal corruption may result in a significant reduction in GPS position accuracy. In this situation, visible light camera 412 and/or two dimensional/three dimensional lidar 406 may be used to identify a location of the vehicle relative to non-mobile objects, such as curbs, light poles, trees, and other suitable landmarks.

In addition to receiving different perspectives of the environment, sensor system 400 provides redundancy in the event of a sensor failure, which facilitates high-integrity operation of the vehicle. For example, in an illustrative embodiment, if visible light camera 412 is the primary sensor used to identify the location of the operator in side-following mode, and visible light camera 412 fails, radio frequency identification reader 418 will still detect the location of the operator through a radio frequency identification tag worn by the operator, thereby providing redundancy for safe operation of the vehicle.

Figure 5:
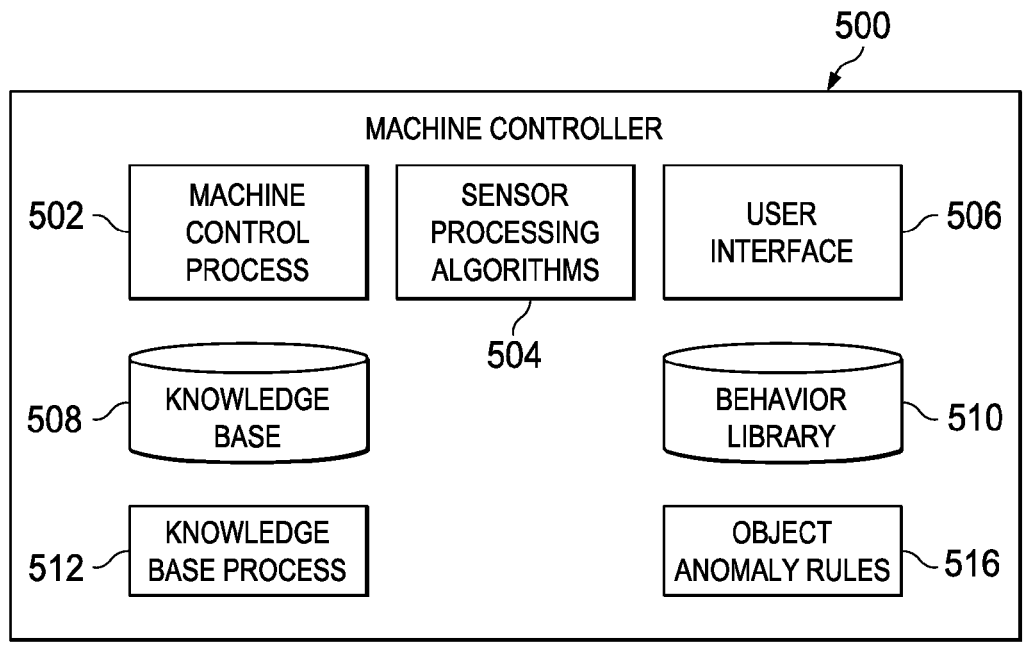
FIG. 5 is a block diagram of functional software components that may be implemented in a machine controller in accordance with an illustrative embodiment.

With reference now to FIG. 5, a block diagram of functional software components that may be implemented in a machine controller is depicted in accordance with an illustrative embodiment. In this example, different functional software components that may be used to control a vehicle are illustrated. The vehicle may be a vehicle, such as truck 104, combine/harvester 110, and mower 114 in FIG. 1. Machine controller 500 may be implemented in a vehicle, such as vehicle 200 in FIG. 2 using a data processing system, such as data processing system 300 in FIG. 3. In this example machine control process 502, sensor processing algorithms 504, user interface 506, knowledge base 508, behavior library 510, knowledge base process 512, and object anomaly rules 516 are present in machine controller 500.

Machine control process 502 transmits signals to steering, braking, and propulsion systems, such as steering system 204, braking system 206, and propulsion system 208 in FIG. 2. Machine control process 502 may also transmit signals to components of a sensor system, such as sensor system 400 in FIG. 4. For example, in an illustrative embodiment, machine control process 502 transmits a signal to a camera component of sensor system 400 in order to pan, tilt, or zoom a lens of the camera to acquire different images and perspectives of an environment around the vehicle. Machine control process 502 may also transmit signals to sensors within sensor system 400 in order to activate, deactivate, or manipulate the sensor itself.

Sensor processing algorithms 504 receives sensor data from sensor system 400 and classifies the sensor data into thematic features. This classification may include identifying objects that have been detected in the environment. For example, sensor processing algorithms 504 may classify an object as a person, curb, tree, waste container, light pole, driveway, or some other type of object. The classification may be performed to provide information about objects in the environment. This information may be used to generate a thematic map, which may contain a spatial pattern of attributes. The attributes may include classified objects. The classified objects may include dimensional information, such as, for example, location, height, width, color, and other suitable information. This map may be used to plan actions for the vehicle. The action may be, for example, planning paths to follow an operator in a side following mode or performing object avoidance.

The classification may be done autonomously or with the aid of user input through user interface 506. For example, in an illustrative embodiment, sensor processing algorithms 504 receives data from a laser range finder, such as two dimensional/three dimensional lidar 406 in FIG. 4, identifying points in the environment. User input may be received to associate a data classifier with the points in the environment, such as, for example, a data classifier of "curb" associated with one point, and "street" with another point. Curb and street are examples of thematic features in an environment. Sensor processing algorithms 504 then interacts with knowledge base 508 to locate the classified thematic features on a thematic map stored in knowledge base 508, and calculates the vehicle position based on the sensor data in conjunction with the landmark localization. The vehicle position may be calculated within an accuracy threshold based on the desired level of accuracy. Machine control process 502 receives the environmental data from sensor processing algorithms 504, and interacts with knowledge base 508 and behavior library 510 in order to determine which commands to send to the vehicle's steering, braking, and propulsion components.

Knowledge base 508 contains information about the operating environment, such as, for example, a fixed map showing streets, structures, tree locations, and other static object locations. Knowledge base 508 may also contain information, such as, without limitation, local flora and fauna of the operating environment, current weather for the operating environment, weather history for the operating environment, specific environmental features of the work area that affect the vehicle, and the like. The information in knowledge base 508 may be used to perform classification and plan actions. Knowledge base 508 may be located entirely in machine controller 500 or parts or all of knowledge base 508 may be located in a remote location that is accessed by machine controller 500.

Behavior library 510 contains various behavioral processes specific to machine coordination that can be called and executed by machine control process 502. In one illustrative embodiment, there may be multiple copies of behavior library 510 on machine controller 500 in order to provide redundancy. The library is accessed by machine control process 502.

Knowledge base process 512 interacts with sensor processing algorithms 504 to receive processed sensor data about the environment, and in turn interacts with knowledge base 508 to classify objects detected in the processed sensor data. Knowledge base process 512 also informs machine control process 502 of the classified objects in the environment in order to facilitate accurate instructions for machine control process 502 to send to steering, braking, and propulsion systems. For example, in an illustrative embodiment, sensor processing algorithms 504 detects tall, narrow, cylindrical objects along the side of the planned path. Knowledge base process 512 receives the processed data from sensor processing algorithms 504 and interacts with knowledge base 508 to classify the tall, narrow, cylindrical objects as tree trunks. Knowledge base process 512 can then inform machine control process 502 of the location of the tree trunks in relation to the vehicle, as well as any further rules that may apply to tree trunks in association with the planned path.

Object anomaly rules 516 provide machine control process 502 instructions on how to operate the vehicle when an anomaly occurs, such as sensor data received by sensor processing algorithms 504 being incongruous with environmental data stored in knowledge base 508. For example, object anomaly rules 516 may include, without limitation, instructions to alert the operator via user interface 506 or instructions to activate a different sensor in sensor system 400 in order to obtain a different perspective of the environment.

Figure 6:
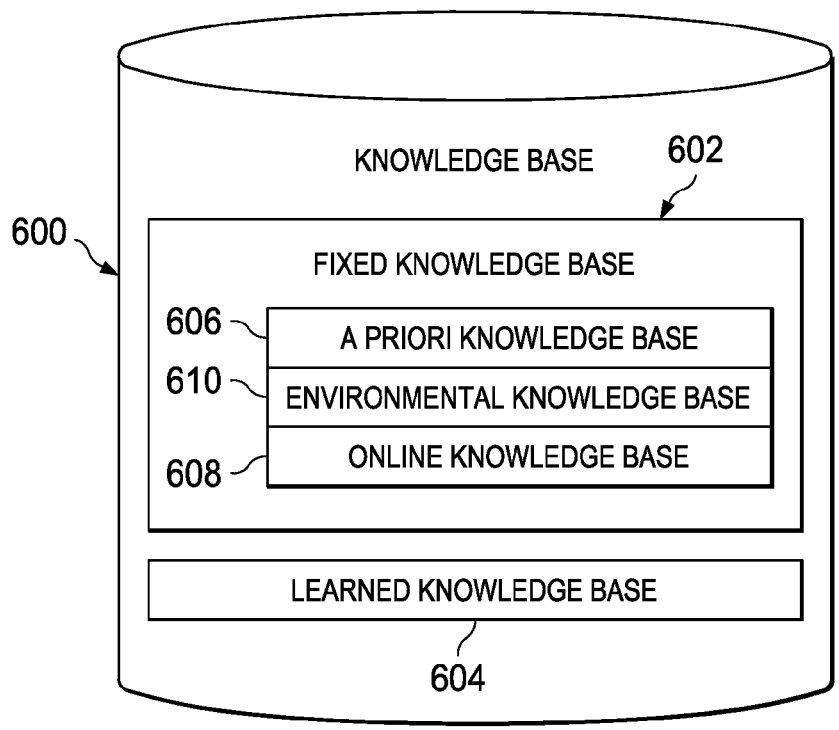
FIG. 6 is a block diagram of a knowledge base in accordance with an illustrative embodiment.

With reference now to FIG. 6, a block diagram of a knowledge base is depicted in accordance with an illustrative embodiment. Knowledge base 600 is an example of a knowledge base component of a machine controller, such as knowledge base 508 of machine controller 500 in FIG. 5. For example, knowledge base 600 may be, without limitation, a component of a navigation system, an autonomous machine controller, a semi-autonomous machine controller, or may be used to make management decisions regarding work-site activities. Knowledge base 600 includes fixed knowledge base 602 and learned knowledge base 604. Fixed knowledge base 602 may include a priori knowledge base 606, online knowledge base 608, and environmental knowledge base 610.

A priori knowledge base 606 contains static information about the operating environment of a vehicle. Types of information about the operating environment of a vehicle may include, without limitation, a fixed map showing streets, structures, trees, and other static objects in the environment; stored geographic information about the operating environment; and weather patterns for specific times of the year associated with the operating environment. A priori knowledge base 606 may also contain fixed information about objects that may be identified in an operating environment, which may be used to classify identified objects in the environment. This fixed information may include attributes of classified objects, for example, an identified object with attributes of tall, narrow, vertical, and cylindrical, may be associated with the classification of "tree." A priori knowledge base 606 may further contain fixed work-site information. A priori knowledge base 606 may be updated based on information from online knowledge base 608, and learned knowledge base 604.

Online knowledge base 608 may be accessed with a communications unit, such as communications unit 212 in FIG. 2, to wirelessly access the Internet. Online knowledge base 608 dynamically provides information to a machine control process which enables adjustment to sensor data processing, site-specific sensor accuracy calculations, and/or exclusion of sensor information. For example, online knowledge base 608 may include current weather conditions of the operating environment from an online source. In some examples, online knowledge base 608 may be a remotely accessed knowledge base. This weather information may be used by machine control process 502 in FIG. 5 to determine which sensors to activate in order to acquire accurate environmental data for the operating environment. Weather, such as rain, snow, fog, and frost may limit the range of certain sensors, and require an adjustment in attributes of other sensors in order to acquire accurate environmental data from the operating environment. Other types of information that may be obtained include, without limitation, vegetation information, such as foliage deployment, leaf drop status, and lawn moisture stress, and construction activity, which may result in landmarks in certain regions being ignored.

In another illustrative environment, online knowledge base 608 may be used to note when certain activities are in process that affect operation of sensor processing algorithms in machine controller 500. For example, if tree pruning is in progress, a branch matching algorithm should not be used, but a tree trunk matching algorithm may still be used, as long as the trees are not being cut down completely. When the machine controller receives user input signaling that the pruning process is over, the sensor system may collect environmental data to analyze and update a priori knowledge base 606 and/or environmental knowledge base 610.

Environmental knowledge base 610 may be integrated with a priori knowledge base 606 in an illustrative embodiment, or alternatively may be a separate component of fixed knowledge base 602 in knowledge base 600. Environmental knowledge base 610 may contain different environmental data than that of a priori knowledge base 606, or may be used to separate environmental data from other data in fixed knowledge base 602.

Learned knowledge base 604 may be a separate component of knowledge base 600, or alternatively may be integrated with a priori knowledge base 606 in an illustrative embodiment. Learned knowledge base 604 contains knowledge learned as the vehicle spends more time in a specific work area, and may change temporarily or long-term depending upon interactions with online knowledge base 608 and user input. For example, learned knowledge base 604 may detect the absence of a tree that was present the last time it received environmental data from the work area. Learned knowledge base 604 may temporarily change the environmental data associated with the work area to reflect the new absence of a tree, which may later be permanently changed upon user input confirming the tree was in fact cut down. Learned knowledge base 604 may learn through supervised or unsupervised learning.

Figure 7:
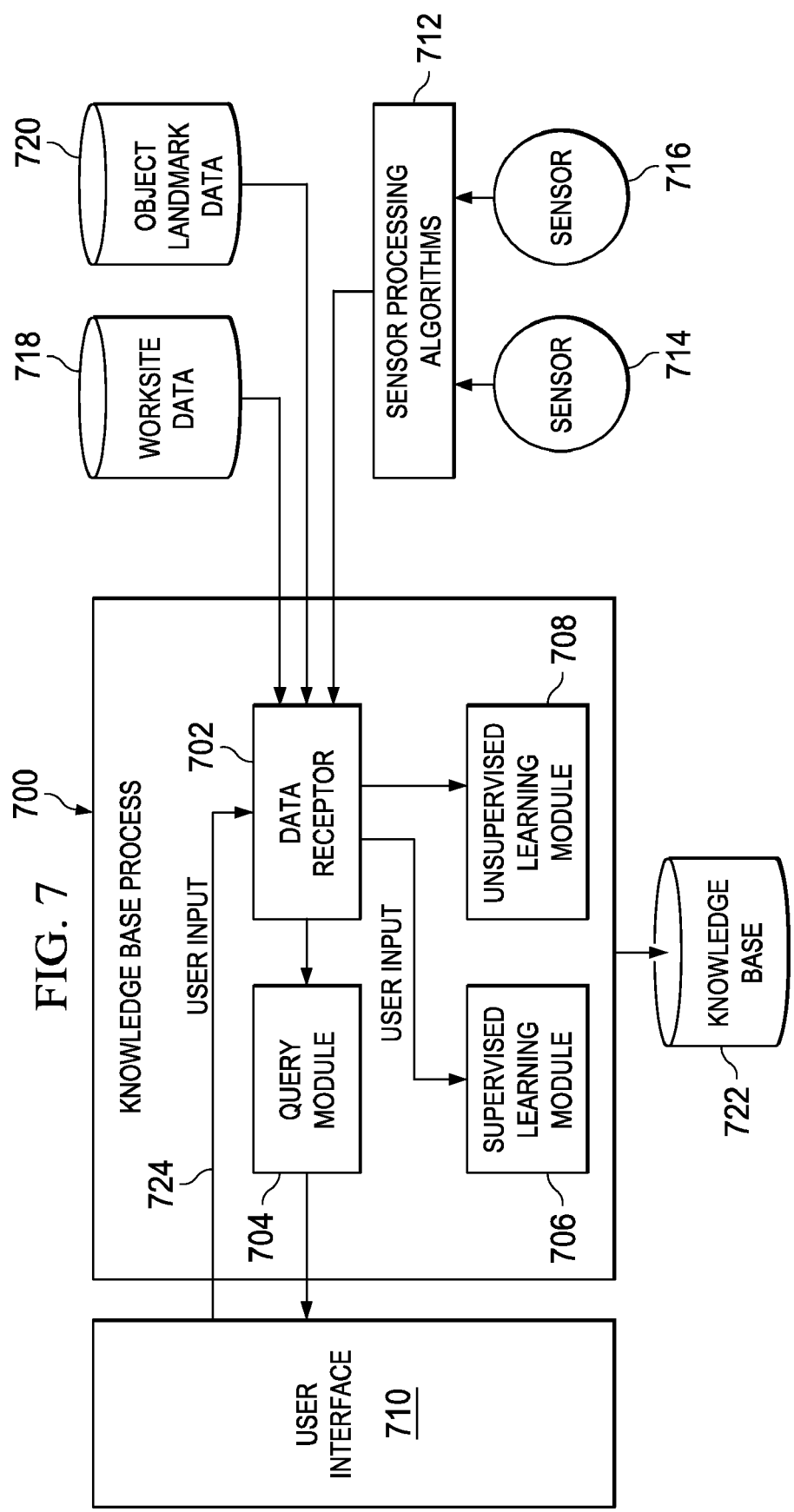
FIG. 7 is a block diagram of a knowledge base process illustrating data flow between components in a machine controller in accordance with an illustrative embodiment.

With reference now to FIG. 7, a block diagram of a knowledge base process illustrating data flow between components in a machine controller is depicted in accordance with an illustrative embodiment. Knowledge base process 700 is an example of knowledge base process 512 in FIG. 5. Knowledge base process 700 comprises data receptor 702, query module 704, supervised learning module 706, and unsupervised learning module 708.

User interface 710 allows an operator to input data from human observation to update or confirm information received in knowledge base process 700. Sensor processing algorithms 712 receives sensor information 714 and 716 from a sensor system of a vehicle, such as sensor system 400 in FIG. 4, and processes sensor information 714 and 716 in conjunction with work-site data 718 and object/landmark data 720 to identify existing conditions of an operating environment. For example, sensor information 714 may be information detecting an object in the environment that is four to six inches high vertically and pavement colored, and another object that is pavement colored and an interruption in the four to six inches high vertical, pavement colored object. Sensor processing algorithms 712 processes this information and sends it to data receptor 702 in knowledge base process 700. Knowledge base process 700 then interacts with knowledge base 722 to compare fixed information about object attributes with the processed sensor data from sensor 714 in order to classify the objects detected. Knowledge base 722 may have an object database that identifies a four to six inch high vertical, pavement colored object as a "curb," and a pavement colored interruption in a four to six inch high vertical object as a "driveway."

Knowledge base process 700 also may identify anomalies or changes in the environment through information received from sensor processing algorithms 712 that may require alerts or updates. For example, knowledge base process 700 may identify objects that may be unexpected or undesirable, such as, without limitation, potholes that need to be repaired, trees that require trimming, improperly parked vehicles, a stolen vehicle, and other suitable objects. These alerts or updates may be sent to unsupervised learning module 708 and stored in knowledge base 722 for later use.

For example, an online knowledge base, such as online knowledge base 604 in FIG. 6, located in knowledge base 722, reports that a tree at a specific location is to be cut down. Sensor 714 gathers environmental information at the specific location and sends the information to sensor processing algorithms 712, which determines that there is no tree at the specific location. Knowledge base process 700 automatically updates a learned knowledge base component of knowledge base 722 with the information confirming that the tree has been cut down. Software running on at a back office, such as back office 102 in FIG. 1 may later remove the alert indicating that a tree at a specific location is to be cut down from knowledge base 722.

Alternatively, the alerts or updates may be sent from data receptor 702 to query module 704 to form a query for the operator displayed through user interface 710. A human operator may then confirm or update the information or anomaly identified through user input 724, which is received by data receptor 702 and transferred to supervised learning module 706. For example, sensor 714 gathers information for a location in the operating environment, and sensor processing algorithms 712 detects that a tree is missing at that location. Sensor processing algorithms 712 sends the information about the missing tree to data receptor 702, which in turn sends the information to query module 704 in order to display a query about the missing tree via user interface 710 to the operator. The operator may then manually confirm that the tree has been cut down through user input 724 which is sent to data receptor 702 and transferred to supervised learning module 706. However, if the tree is in fact still at the location, the operator may indicate as much through user input 724, and query module 704 may then provide appropriate options through user interface 710, such as the option to correct the vehicle's estimated position, or the option to correct a tree attribute, in one illustrative embodiment.

FIG. 7 is presented to show one manner in which a knowledge base process may be implemented and not meant to imply architectural limitations to different embodiments. The different components illustrated are functional components. These functional components may be combined and other components may be included in addition to or in placed of the ones illustrated. For example supervised learning module 706 and unsupervised learning module 708 may be combined as a single process or component in some implementations.

Figure 8:
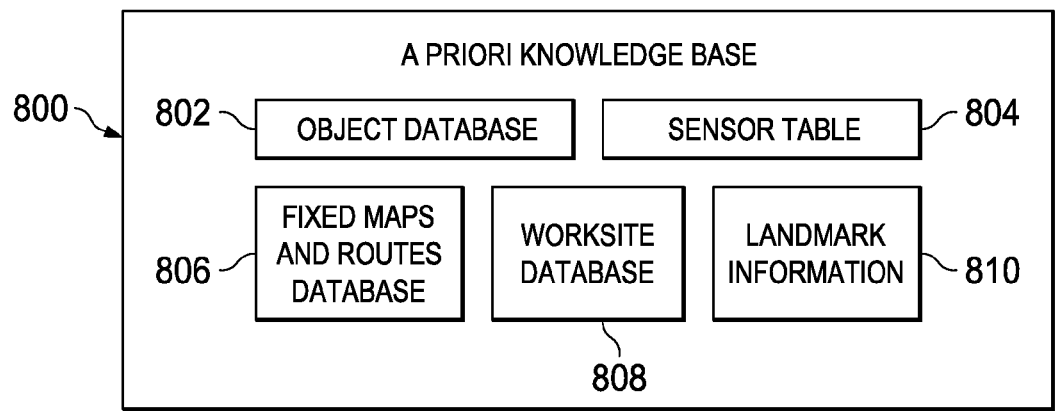
FIG. 8 is a block diagram of an a priori knowledge base in accordance with an illustrative embodiment.

With reference now to FIG. 8, a block diagram of an a priori knowledge base is depicted in accordance with an illustrative embodiment. A priori knowledge base 800 is an example of a priori knowledge base 602 in FIG. 6 located in a knowledge base, such as knowledge base 508 in FIG. 5. A priori knowledge base 800 includes object database 802, sensor table 804, fixed maps and routes database 806, work-site database 808, and landmark information 810.

Object database 802 contains attribute and classification information about objects that may be detected in the environment. For example, attributes may include features, such as tall, narrow, vertical, cylindrical, smooth texture, rough texture, bark texture, branches, leaves, no branches, no leaves, short, color, four to six inch high vertical, interruption in four to six inch high vertical, and the like. Classifiers may include, for example, tree, light pole, fire hydrant, curb, driveway, street, waste container, house, garage door, and the like. These attributes and classifiers are used to identify and classify the objects detected by a sensor system, such as sensor system 400 in FIG. 4. Sensor table 804 is a format used to select sensors for use in planning paths, obstacle avoidance, vehicle localization, and utilizing the best sensors for the current operating environment.

Fixed maps and routes database 806 contains static maps and routes of various work-sites. These maps and routes may be sent from back office software, such as back office 102 in FIG. 1, or may be transferred from an online database, such as online knowledge base 604, at the direction of back office software or a human operator. Fixed maps and routes database 806 can be accessed by sensor processing algorithms 704 in FIG. 7 when identifying object anomalies in an operating environment, in order to compare the fixed map our route with the current information received from sensors, such as sensor 712 in FIG. 7.

Work-site database 808 may contain, for example, specific information about the attributes and location of objects in a particular work-site, information about the weather patterns and normal environmental conditions for the work-site, instructions about specific vehicle movements that should be executed in the work-site, and the like. Landmark information 810 may include information about the attributes and locations of visible landmarks that can be used for vehicle localization. For example, landmark information 810 may contain detailed information about the location of houses in a neighborhood where waste collection activities take place. Houses are example of landmarks that are usually fixed for long periods of time, and can be identified in the same location upon multiple passes of a vehicle.

FIG. 8 is presented to show one manner in which an a priori knowledge base may be implemented and not meant to imply architectural limitations to different embodiments. The different components illustrated are functional components. These functional components may be combined and other components may be included in addition to or in place of the ones illustrated. For example object database 802 and landmark information 810 may be combined as a single process or component in some implementations.

Figure 9:
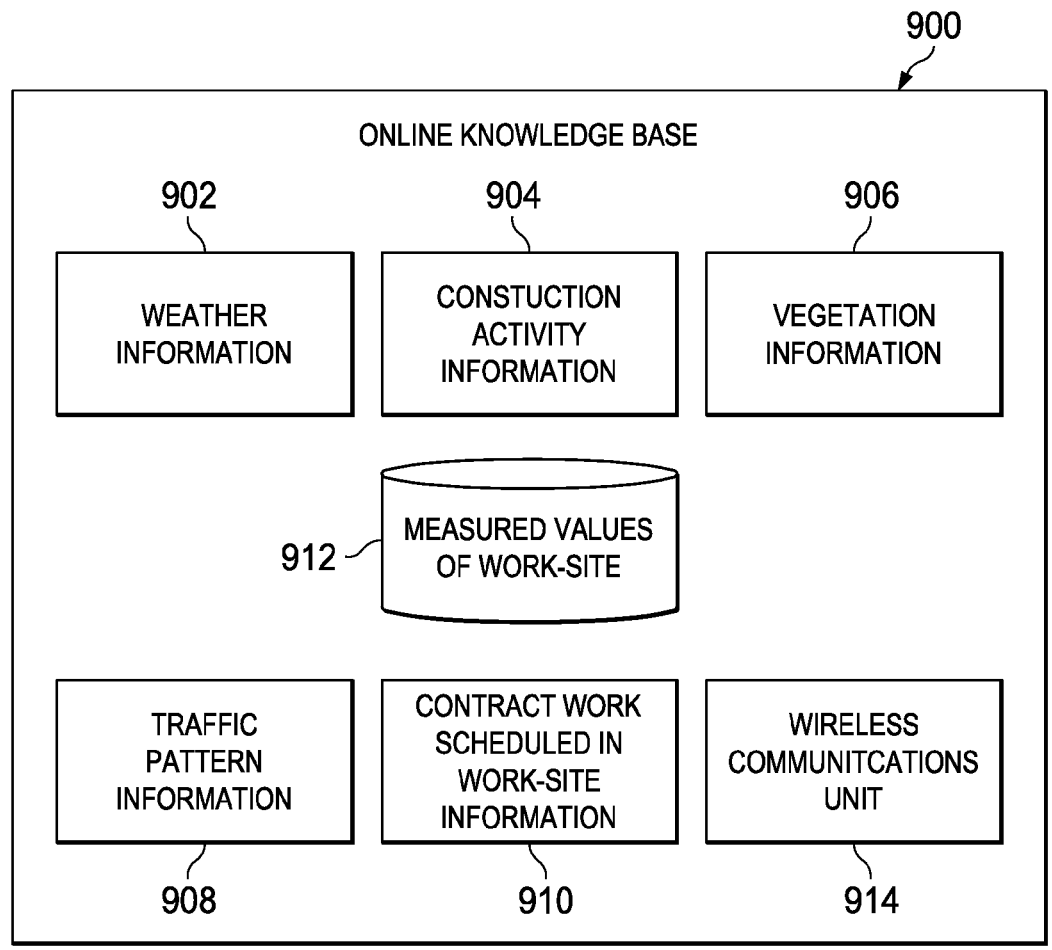
FIG. 9 is a block diagram of an online knowledge base in accordance with an illustrative embodiment.

With reference now to FIG. 9, a block diagram of an online knowledge base is depicted in accordance with an illustrative embodiment. Online knowledge base 900 is an example of online knowledge base 604 in FIG. 6 located in a knowledge base, such as knowledge base 508 in FIG. 5. Online knowledge base 900 dynamically provides information which enables adjustments to sensor data processing, for example by sensor processing algorithms 704 in FIG. 7, adjustments to site-specific sensor accuracy calculation by sensors, such as sensors 712 and 714 in FIG. 7, and/or exclusion of sensor information from a final position estimate by a machine controller, such as machine controller 202 in FIG. 2. Online knowledge base 900 includes weather information 902, construction activity information 904, vegetation information 906, traffic pattern information 908, contract work scheduled in work-site information 910, measured values of work-site 912, and wireless communications unit 914.

Weather information 902 may include the current weather conditions reported for the operating area, such as reports of rain, snow, fog, and frost. These types of weather conditions may limit the range of certain sensors and require an adjustment in sensor attributes for processing the information from other sensors. These types of weather conditions may also temporarily obscure landmark features used for localization and position estimates, such as the landmarks identified in the information stored in landmark information 810 in FIG. 8. Construction activity information 904 may indicate construction activity in an operating environment, which results in certain landmarks being ignored in that area, for example. In an illustrative embodiment, construction activity information 904 indicates that a house is being remodeled on a lot in the area where the vehicle is operating. This information is used by knowledge base process 700 in FIG. 7 to eliminate the landmark of that particular house from position estimates based on the temporary change in that landmark's attributes, which may inaccurately alter the position estimate of the vehicle if considered.

Vegetation information 906 enables reports of vegetation conditions to be accessed, such as reports of foliage deployment, leaf drop status, and lawn moisture stress, for example. This information can be used in sensor processing, such as sensor processing algorithms 704 in FIG. 7, along with sensor table 804 in FIG. 8, to determine which sensors are best able to detect position and localization of the vehicle. Traffic pattern information 908 enables reports of current traffic patterns for an operating area to be accessed, and used by knowledge base process 700 in FIG. 7, as well as machine controller 202 in FIG. 2 to determine a safe path for the vehicle in the operating environment. In one illustrative embodiment, this information may be displayed to a human operator via a user interface display affixed to the outside of a vehicle, in order to allow the operator to determine whether autonomous or semi-autonomous mode should be used given the current traffic patterns.

Contract work scheduled in work-site information 910 is used to determine whether certain work has been performed in an area. The scheduling would be done by another software application program with access to online knowledge base 900 and provided to online knowledge base 900 for work-site assessment. For example, when the vehicle sensor system has detected a build-up of leaves in the gutter along a curb through unsupervised learning 722 in FIG. 7, and reported the condition, a street department may schedule street sweepers to come to the area and clear the street gutters. On the next pass the vehicle takes in that area, contract work scheduled in work-site information 910 may indicate that the street sweepers were scheduled to have cleared the gutters prior to the current time, and the vehicle sensor system will detect whether the gutters are clear or still obstructed by leaves, and log the information through unsupervised learning 722 in FIG. 7.

Wireless communications unit 914 allows online knowledge base 900 to access the internet and to interact with back office software, such as back office 102 in FIG. 1, and other wireless communication devices. Measured values of work-site 912 contain information about an area or location at which the vehicle is to travel to and/or through. Measured values of work-site 912 may include information about the work-site, such as, for example, without limitation, the presence of other vehicles, the parked status of a vehicle detected, the moving status of a vehicle detected, vegetation health for trees, grass, and the like, pile sizes and location for snow, soil, gravel, and other materials, surface condition of the street, road, or path, the presence of potholes, fairway and green defects, crop residue on the soil, and the like.

FIG. 9 is presented to show one manner in which an online knowledge base may be implemented and not meant to imply architectural limitations to different embodiments. The different components illustrated are functional components. These functional components may be combined and other components may be included in addition to or in placed of the ones illustrated.

Figure 10:
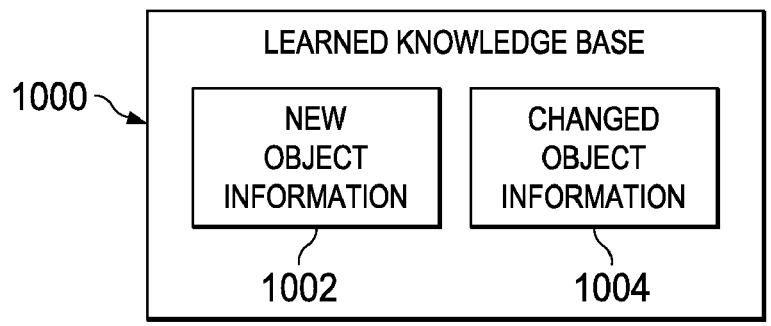
FIG. 10 is a block diagram of a learned knowledge base in accordance with an illustrative embodiment.

With reference now to FIG. 10, a block diagram of a learned knowledge base is depicted in accordance with an illustrative embodiment. Learned knowledge base 1000 is an example of learned knowledge base 608 in FIG. 6 located in a knowledge base, such as knowledge base 508 in FIG. 5. Learned knowledge base 1000 contains knowledge learned as the vehicle spends more time in a work-site or operating environment, and may use supervised or unsupervised learning techniques. Learned knowledge base 1000 includes new object information 1002 and changed object information 1004.

New object information 1002 is information about an object detected in the operating environment that has not been there before, or is not present on the fixed map or route for the area retrieved from fixed maps and routes database 806 in FIG. 8. New objects may be, for example, a new tree planted, a new house built, a car parked in a driveway, a car parked along a street, a new light pole erected, and the like. Changed object information 1004 contains information about an object detected that is incongruous with previous information about an object, or information about an operating environment that is incongruous with previous information about the operating environment. Incongruous information may be, for example, the absence of an object that was once present or a change in attributes of an object that has been present and previously identified.

Learned knowledge base 1000 contains knowledge which is not persistent, authoritative, or pre-existing to the knowledge in a priori knowledge base 800 in FIG. 8. The learned knowledge may also include human observations for which sensors or software is not provided. For example, if in the spring a notable bird is found nesting in a given location on a golf course, the species and nest location may be added to learned knowledge base 1000 with a flag for a supervisor to add further notations, and instructions for the mower, such as mower 114 in FIG. 1, to avoid the area around the nest, or to run in hybrid mode on a battery for quiet operation in the 100 meter area around the nest.

FIG. 10 is presented to show one manner in which a learned knowledge base may be implemented and not meant to imply architectural limitations to different embodiments. The different components illustrated are functional components. These functional components may be combined and other components may be included in addition to or in placed of the ones illustrated.

With reference now to FIG. 11, a block diagram of a format in a knowledge base used to weigh and select sensors for use in planning paths and obstacle avoidance is depicted in accordance with an illustrative embodiment. This format may be used by knowledge base process 512 and machine control process 502 in FIG. 5.

The format is depicted in sensor table 1100 illustrating heterogeneous sensor redundancy for localization of the vehicle. Global positioning systems 1102 would likely not have real time kinematic accuracy in a typical street environment due to structures and vegetation. Normal operating conditions 1104 would provide good to poor quality signal reception 1106 because the global positioning system signal reception quality would depend upon the thickness of the tree canopy over the street. In early fall 1108, when some leaves are still on the trees and others are filling the gutter or ditch alongside the road, the canopy thickness may offer good to poor quality signal reception 1110. However, in winter 1112, when trees other than evergreens tend to have little to no leaves, signal reception may be good to very good 1114.

Visible camera images of a curb or street edge 1116 might offer excellent quality images 1118 in normal operating conditions 1104. However, in early fall 1108 and winter 1112, when leaves or snow obscure curb or street edge visibility, visible camera images would offer unusable quality images 1120 and 1122. Visible camera images 1124 of the area around the vehicle, with an image height of eight feet above the ground, would offer excellent quality images 1126, 1128, and 1130 in most seasons, although weather conditions, such as rain or fog may render the images unusable. Landmarks identified at eight feet above the ground include objects, such as, without limitation, houses, light poles, and tree trunks. This height is typically below tree canopies and above transient objects, such as cars, people, bikes, and the like, and provides a quality zone for static landmarks.

Visible camera images of the street crown 1132 may offer good quality images 1134 in normal operating conditions 1104. The street crown is typically the center of the street pavement, and images of the pavement may be used in a pavement pattern matching program for vehicle localization. In early fall 1108, when leaves begin to fall and partially obscure the pavement, visible camera images of the street crown 1132 may be good to poor quality images 1136 depending on the amount of leaves on the ground. In winter 1112, the visible camera images of the street crown 1132 may be unusable quality images 1138 due to fresh snow obscuring the pavement.

Lidar images of a curb 1140 using pulses of light may be excellent 1142 for detecting a curb or ground obstacle in normal operating conditions 1104, but may be unusable 1144 when curb visibility is obscured by leaves in early fall 1108 or snow in winter 1112. Lidar detection of the area eight feet above the ground 1146 around the vehicle may be excellent 1148 in normal operating conditions 1104, early fall 1108, and winter 1112, because the landmarks, such as houses and tree trunks, are not obscured by falling leaves or fresh snow. Lidar images of the sky 1150 captures limb patterns above the street for use in limb pattern matching for vehicle localization. Lidar images of the sky 1150 would be unusable due to the canopy 1152 in normal operating conditions 1104, and unusable to poor 1154 in the early fall 1108 when the majority of leaves remain on the limbs. However, lidar images of the sky 1150 may be excellent 1156 in winter 1112 when limbs are bare.

Current environmental conditions are also used to weigh the sensor data in sensor table 1100. Sensor data may be weighted in order to facilitate sensor selection, or in order to give some sensor data more weight in an accuracy determination than other sensor data. For example, in an illustrative embodiment, global positioning system 1102 is operating in winter 1112 where good to very good signal reception 1114 is expected. However, current environmental conditions around the vehicle with global positioning system 1102 are degrading the signal reception. Current environmental conditions may be, in this illustrative example, the presence of evergreen trees with a thick canopy despite the winter conditions. Accordingly, global positioning system 1102 may still be selected, but the data received may be weighted less than the data from another sensor that is not degraded by the current environmental conditions.

Figure 12:
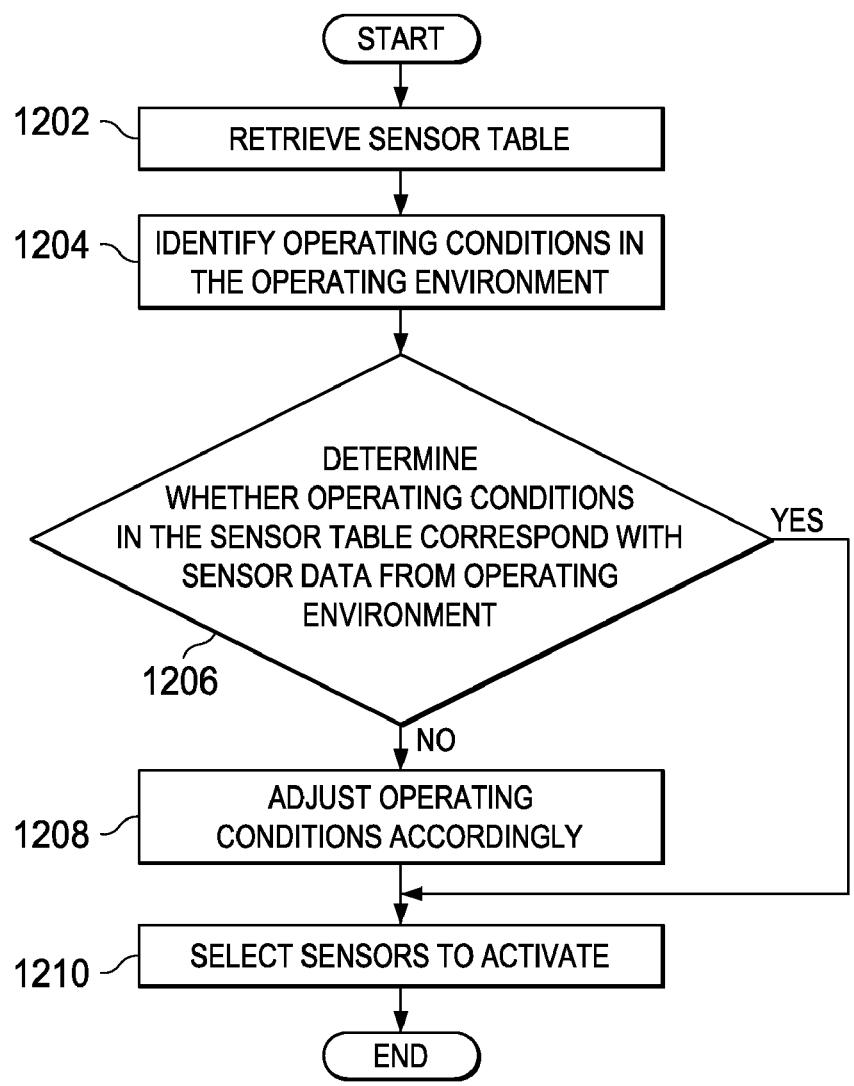
FIG. 12 is a flowchart illustrating a process for sensor selection in accordance with an illustrative embodiment.

With reference now to FIG. 12, a flowchart illustrating a process for sensor selection is depicted in accordance with an illustrative embodiment. This process may be executed by knowledge base process 512 in FIG. 5.

The process begins by retrieving the sensor table (step 1202), such as sensor table 1100 in FIG. 11. The process identifies operating conditions (step 1204) in the operating environment through sensor data received from a sensor system, such as sensor system 400 in FIG. 4. The process then determines whether the operating conditions in the sensor table correspond with sensor data from the operating environment (step 1206). If the sensor data from the environment does not correspond to the preset operating conditions in the sensor table, the process adjusts the operating conditions accordingly (step 1208) and selects the sensors to activate (step 1210), with the process terminating thereafter. If the process determines that the sensor data corresponds with the sensor table information, the process moves directly to select the sensors to activate (step 1210), with the process terminating thereafter.

With reference now to FIG. 13, a flowchart illustrating a process for prioritizing sensor data is depicted in accordance with an illustrative embodiment. This process may be executed by a priori knowledge base 800 in FIG. 8.

The process begins by receiving information about the environment from sensor data (step 1302) and comparing the information about the environment received from sensor data with the sensor table (step 1304) stored in a priori knowledge base 800 in FIG. 8. For example, information about the environment may be current weather conditions, such as the presence of rain, snow, sleet, or fog, and the like. Information about the environment may also be the current operating status of the different components of a sensor system, such as sensor system 400 in FIG. 4. Next, the process calculates the differences and similarities in the information and the sensor table (step 1306). For example, the information received about the environment may be the detection of rain and information about the limited visibility of a visible light camera component of the sensor system on the vehicle. The sensor table, such as sensor table 1100 in FIG. 11, may indicate that normal operating conditions 1104 provide good quality images 1134 through visible camera images of the street crown 1132. However, due to the current environmental condition of rain, and the limited visibility of the visible light camera component, the sensor data received from the visible light camera component may be weighted less heavily than other sensor data. Next, the process assigns an a priori weighting to the data based on the calculation (step 1308), with the process terminating thereafter.

For example, the vehicle may be operating in normal operating conditions mode, with the online knowledge base indicating it is spring. The sensor table may indicate that the appropriate sensors for normal operating conditions are visible light camera with a view of the street crown, and visible light camera with a view of road edge. However, information about the environment received from the sensors may indicate that snow is covering the ground and obscuring the street and curb or road edge, perhaps due to a late snow. The detection of snow may be verified by accessing the online knowledge base for current weather conditions. As a result, the sensor data indicating snow may be weighed more heavily than information from the sensor table about normal operating conditions, with the sensors chosen to activate adjusted accordingly.

With reference now to FIG. 14, a flowchart illustrating a process for unsupervised learning by a knowledge base is depicted in accordance with an illustrative embodiment. This process may be executed by knowledge base process 700 in FIG. 7.

The process begins by receiving information for an area of interest (step 1402). An area of interest may be, for example, a work area or a specific planned path. The process compares the information with the knowledge base (step 1404) in order to detect object anomalies. An object anomaly may be identified using the knowledge base. For example, an a priori knowledge base and/or an online knowledge base may be consulted to determine whether any of the classified objects have attributes that are different enough from the expected attributes.

Next, the process determines whether object anomalies are present (step 1406). Step 1406 also may involve determining whether objects are present in the environment where objects are unexpected or should not be present. For example, step 1406 may identify vehicles that are parked in no parking areas based on information from the knowledge base. As another example, step 1406 may identify potholes, trees that need trimming, stolen vehicles, or other object anomalies of interest. In these examples, an object anomaly also may be an absence of an object. For example, if a tree is indicated as being present in an online knowledge base and the tree is not found in the location, this fact may be considered an object anomaly.

If no object anomalies are present, the process returns to receiving information for an area of interest (step 1402). If object anomalies are present, the process updates the learned knowledge base with the object anomaly (step 1408). Next, the process determines whether other knowledge bases should be updated with the anomaly (step 1410). If other knowledge bases should be updated, the process performs the update (step 1412) with the process terminating thereafter. For example, if a rule exists indicating that an a priori knowledge base should be updated whenever a permanent change in an object is detected, and the object anomaly updated in the learned knowledge base is a permanent change in an object, the process may update the a priori knowledge base with the object anomaly or change. In another example, if multiple vehicles are utilized for a work-site, and the learned database of one vehicle is updated with an object anomaly for the work-site, the update may be sent to the learned knowledge bases of the other vehicles operating in the work-site. If other knowledge bases should not be updated in step 1410, the process terminates.

With reference now to FIG. 15, a flowchart illustrating a process for supervised learning by a knowledge base is depicted in accordance with an illustrative embodiment. This process may be executed by knowledge base process 700 in FIG. 7.

The process begins by monitoring for objects in an area of interest and for object anomalies (step 1502). An area of interest may be, for example, a work area or a specific planned path. The process determines whether objects anomalies are detected in the area of interest (step 1504). If no objects are detected, the process continues to monitor for objects (step 1502). If one or more objects are detected, the process generates an alert (step 1506). The alert may be displayed, for example, to a human operator via a user interface, such as user interface 506 in FIG. 5. Next, the process receives user input about the object anomaly (step 1508), and updates the learned knowledge base with the object anomaly in the area of interest based on the user input (step 1510), with the process terminating thereafter.

User input regarding the object anomaly may vary. For example, the anomaly detected may be the absence of a tree where a tree existed previously. The anomaly could arise due to several factors, such as the tree being removed from the environment or failure of one or more sensors to detect the tree due to environmental conditions in the operating environment. Examples of environmental conditions that may degrade sensor performance include conditions, such as, without limitation, rain, fog, or snow. When the process generates an alert indicating that a tree was not detected where a tree previously existed, it allows an operator to confirm or supplement the information received from the sensor system. For example, the operator may use human observation to detect that the tree has been removed from the environment, and may submit user input that confirms the absence of the tree. The operator may supplement that confirmation with information obtained through human observation, such as knowledge that the tree was cut down during a pruning operation. In another example, the operator may observe that the tree is still there, and that environmental conditions degraded sensor perception, which led to the detection of the object anomaly. In this example, the operator may submit user input indicating that the tree is still there, and that other sensors should be activated or relied upon given the environmental conditions that are causing sensor degradation.

These illustrative examples provided in FIG. 15 are presented to show possible manners in which a supervised learning process may be implemented in a knowledge base and are not meant to imply architectural limitations to different embodiments. The different components illustrated are functional components. These functional components may be combined and other components may be included in addition to or in place of the ones illustrated.

With reference now to FIG. 16, a flowchart illustrating a process for updating an a priori knowledge base in conjunction with supervised learning is depicted in accordance with an illustrative embodiment. This process may be implemented by knowledge base process 700 in FIG. 7.

The process begins by checking the learned knowledge base for recent changes (step 1602) and determining whether changes have been updated in the a priori knowledge base (step 1604). Recent changes may be found in changed object information 1004 or new object information 1002 in learned knowledge base 1000 in FIG. 10. If the changes have not been updated, the process sends recent updates to the back office for processing (step 1606). The back office may be software located remotely from the knowledge base process, such as back office 102 in FIG. 1. Next, the process receives formatted update information for the a priori knowledge base (step 1608) and stores the updated information in the a priori knowledge base (step 1610), with the process terminating thereafter. If the changes have already been updated in the a priori knowledge base in step 1604, the process terminates.

Figure 17:
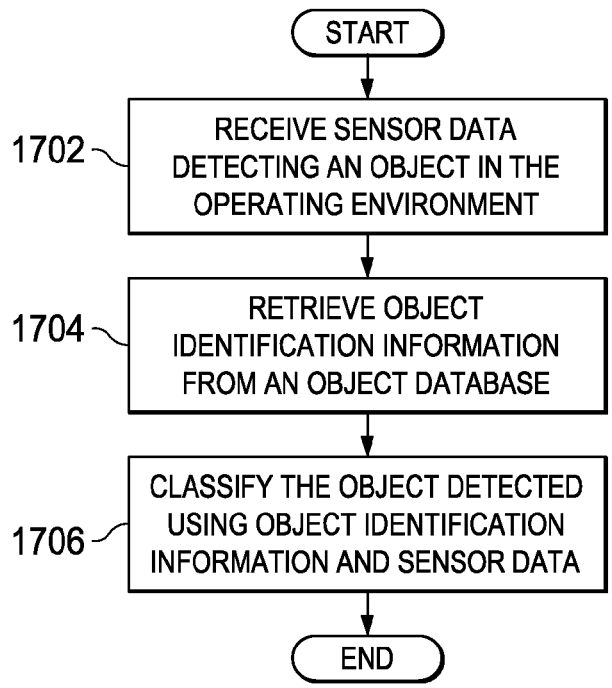
FIG. 17 is a flowchart illustrating a process for object classification in accordance with an illustrative embodiment.

With reference now to FIG. 17, a flowchart illustrating a process for object classification is depicted in accordance with an illustrative embodiment. This process may be implemented by knowledge base process 700 in FIG. 7.

The process begins by receiving sensor data detecting an object in the operating environment (step 1702). For example, without limitation, an object might be a tree, light pole, person, animal, vehicle, and the like. Next, the process retrieves object identification information from an object database (step 1704), such as object database 802 in a priori knowledge base 800 in FIG. 8. Object information includes attributes and classifiers for objects detected in an operating environment. Attributes may include, for example, features, such as tall, narrow, vertical, cylindrical, smooth texture, rough texture, bark texture, branches, leaves, no branches, no leaves, short, color, four to six inch high vertical, interruption in four to six inch high vertical, and the like. Classifiers may include, for example, tree, light pole, fire hydrant, curb, driveway, street, waste container, house, garage door, and the like. The process classifies the object detected using object identification information and sensor data (step 1706), with the process terminating thereafter.

Figure 18:
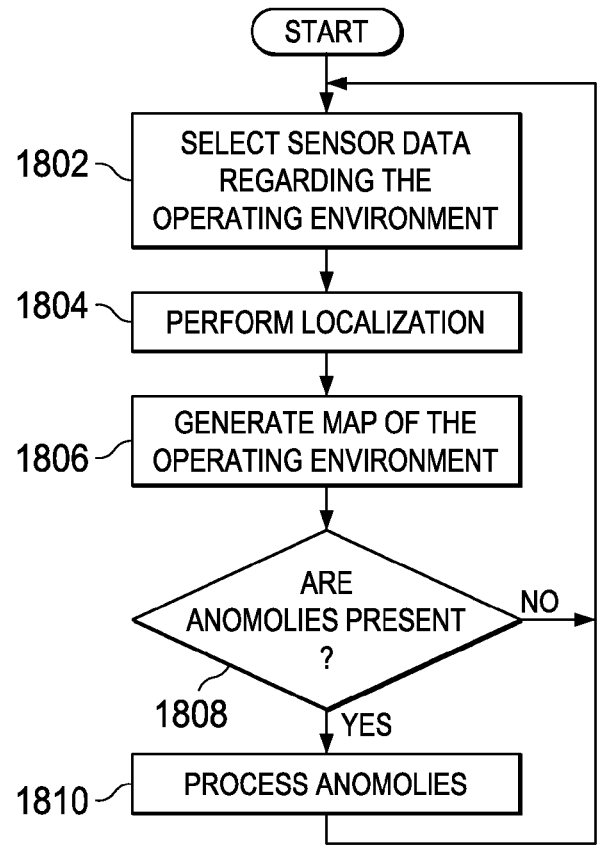
FIG. 18 is a flowchart illustrating a process for processing object anomalies in accordance with an illustrative embodiment.

With reference now to FIG. 18, a flowchart illustrating a process for processing object anomalies is depicted in accordance with an illustrative embodiment. The process illustrated in FIG. 18 may be implemented in a software component, such as object anomaly rules 516 in FIG. 5.

The process begins by selecting sensor data regarding the operating environment (step 1802). The process performs localization (step 1804) based on the sensor data, and generates a map of the operating environment (step 1806). The map may be generated by accessing a fixed map and route database of an a priori knowledge base, such as fixed maps and routes database 806 of a priori knowledge base 800 in FIG. 8, and retrieving the map associated with the location of the vehicle as identified by the sensor system, such as sensor system 400 in FIG. 4. Next, the process determines whether object anomalies are present (step 1808). An object anomaly may be, for example, the presence of an object that is unaccounted for, the presence of an object that is not yet identified, a change in a previously identified object, the absence of an object, and the like. If anomalies are not present, the process returns to select sensor data regarding the operating environment (step 1802). If anomalies are present, the process processes the anomalies (step 1810), and returns to select sensor data regarding the operating environment (step 1802). Processing anomalies may include updating one or more knowledge bases, such as learned knowledge base 604 in FIG. 6, with the object anomaly information.

With reference now to FIG. 19, a flowchart illustrating a process for generating a thematic map is depicted in accordance with an illustrative embodiment. The process illustrated in FIG. 19 may be implemented in a software component, such as knowledge base process 512 in FIG. 5.

The process begins by receiving sensor data regarding the operating environment (step 1902). The process identifies superior sensor processing algorithms for the operating conditions (step 1904) and performs localization (step 1906). Next, the process retrieves a static map of the environment (step 1908) from fixed map/route database 806 of a priori knowledge base 800 in FIG. 8 for example. The process receives sensor data detecting objects in the operating environment (step 1910) from a sensor system, such as sensor system 400 in FIG. 4. The process then classifies the objects and populates the static map with the detected classified objects (step 1912) in order to form a thematic map, with the process terminating thereafter. The thematic map may be stored in a knowledge base, such as knowledge base 508 in FIG. 5 and used by machine control process 502 in FIG. 5 to execute a planned path while avoiding obstacles identified in the thematic map.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The description of the different advantageous embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A computer program product comprising:
a non-transitory computer recordable media;
computer usable program code, stored on the computer recordable media, for identifying a dynamic condition, and responsive to identifying the dynamic condition, controlling the vehicle using a knowledge base comprising an a priori knowledge base, an online knowledge base, and a learned knowledge base, wherein the online knowledge base dynamically provides information to a machine controller of the vehicle which enables adjustment to sensor data processing by the machine controller, and wherein the machine controller identifies an environment around the vehicle using the online knowledge base.

2. The computer program product of claim 1, further comprising:
computer usable program code for selectively updating the learned knowledge base using the dynamic conditions.

3. The computer program product of claim 2, wherein the selectively updating step comprises:
computer usable program code for updating the learned knowledge base with changes to a set of objects in the environment.

* * * * *